United States Patent Office 3,480,613
Patented Nov. 25, 1969

3,480,613
2-C OR 3-C-ALKYLRIBOFURANOSYL - 1-SUB-
STITUTED COMPOUNDS AND THE NUCLE-
OSIDES THEREOF
Edward Walton, Scotch Plains, N.J., assignor to Merck
& Co., Inc., Rahway, N.J., a corporation of New
Jersey
No Drawing. Continuation-in-part of applications Ser. No.
507,697 and Ser. No. 507,718, both Nov. 15, 1965, and
Ser. No. 546,531, May 2, 1966. This application July
3, 1967, Ser. No. 650,610
Int. Cl. C07c 47/18; C17k 9/00
U.S. Cl. 260—209                      30 Claims

ABSTRACT OF THE DISCLOSURE

Novel branched-chain sugar nucleosides, for instance, 2-(or 3)-C-alkylribofuranosyl purine or pyrimidine nucleosides are prepared by reaction of novel 2,3,5-tri-O-acyl-2-(or 3)-C-alkyl-D-ribofuranosyl halides with a known chloromercuri purine or pyrimidine compound. The novel nucleosides are useful in in vitro inhibition of KB cells.

CROSS REFERENCES TO RELATED
APPLICATIONS

This application is a continuation-in-part of copending United States applications Ser. No. 507,697, filed Nov. 15, 1965; Ser. No. 507,718, filed Nov. 15, 1965; and Ser. No. 546,531, filed May 2, 1966, all of which applications were independently filed, and all now abandoned.

This invention relates to novel branched-chain sugar nucleosides. More particularly, this invention relates to purine and pyrimidine ribofuranose nucleosides which have an alkyl group at the 2'-C or 3'-C-position in the ring of the sugar moiety. Thus, the novel compounds of the present invention are singly branched, and not at the site of a side-chain. This invention also relates to the novel 2-C-alkyl and 3-C-alkyl-ribofuranose intermediates used for the preparation of the branched-chain sugar nucleosides, and to processes for the preparation therefor.

The novel branched-chain sugar nucleosides are the α and/or β-anomers of nucleosides represented by Formulas A and B, and of the novel intermediates by Formula C:

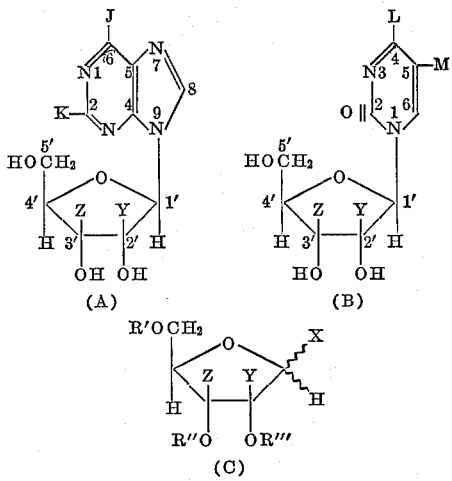

wherein

J and K may be the same or different, hydrogen, lower alkyl, halogen, mercapto, lower alkylmercapto, amino, or lower alkyl substituted amino, provided that when J is amino and K is hydroxy, the ribofuranoyl moiety may also be joined to the purine at the 7-position;

L and M may be the same or different, alkoxy, hydroxy, amino, or alkyl substituted amino, and, in addition, M may also be hydrogen, alkyl, halogen or halogenated alkyl, especially trifluoromethyl;

R', R" and R'" are each hydrogen, or an acyl residue of an organic carboxylic acid selected from the group consisting of lower alkanoyl, benzoyl, or substituted benzoyl;

X is chloro, bromo, hydroxy, lower alkoxy or acyl, where acyl is defined as heretofore; and Y and Z are each lower alkyl or hydrogen, provided that when Y is lower alkyl Z is hydrogen, and when Y is hydrogen Z is lower alkyl.

Typical of the alkanoyl groups are acetyl, propionyl and butyryl. The benzoyl group may be unsubstituted, or substituted by lower alkyl (toluyl or xyloyl); lower alkoxy such as methoxybenzoyl or ethoxybenzoyl; halobenzoyl such as chlorobenzoyl or bromobenzoyl; and nitrobenzoyl.

The compounds of the present invention have demonstrated the in vitro ability to inhibit ribonucleic acid (RNA) synthesis, for example, acid insoluble RNA synthesis in KB cells. In in vitro tests, the growth of KB cells are markedly suppressed. In addition, they show a marked resistance in vitro to the action of adenosine deaminase.

The nucleosides may also be converted to nucleotides by treatment with phosphoric acid derivatives in accordance with known techniques. As such, they are useful in a formulation of media for selective culturing of animal tissue cells. These nucleotides may also be useful in the study of nucleic acid metabolism.

The novel intermediates (C) are useful in preparing the branched-chain sugar nucleosides (A) and (B) which have the above-described biological properties.

The novel intermediates containing a branched-chain sugar are the α and β-anomers of the compounds represented by Formula C:

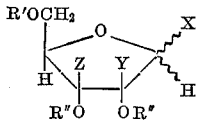

wherein

R', R" and R'" are each hydrogen, or an acyl residue of an organic carboxylic acid selected from the group consisting of lower alkanoyl, benzoyl, or substituted benzoyl;

X is chloro, bromo, hydroxy, lower alkoxy or acyl, where acyl is defined as heretofore; and Y and Z are each lower alkyl or hydrogen, provided that when Y is lower alkyl Z is hydrogen, and when Y is hydrogen Z is lower alkyl.

Typical compounds are 2,3,5-tri-O-acetyl-2-C-methyl-D-ribofuranosyl chloride,
2,3,5-tri-O-propionyl-2-C-methyl-D-ribofuranosyl chloride,
2,3,5-tri-O-butyryl-2-C-methyl-D-methyl-D-ribofuranosyl chloride,
2,3,5-tri-O-benzoyl-2-C-methyl-D-ribofuranosyl chloride,
2,3,5-tri-O-toluyl-2-C-methyl-D-ribofuranosyl chloride,
2,3,5-tri-O-xyloyl-2-C-methyl-D-ribofuranosyl chloride,
2,3,5-tri-O-methoxybenzoyl-2-C-methyl-D-ribofuranosyl chloride,
2,3,5-tri-O-chlorobenzoyl-2-C-methyl-D-ribofuranosyl chloride,
2,3,5-tri-O-p-nitrobenzoyl-2-C-methyl-D-ribofuranosyl chloride,
2,3,5-tri-O-benzoyl-2-C-ethyl-D-ribofuranosyl chloride,
2,3,5-tri-O-benzoyl-2-C-n-propyl-D-ribofuranosyl chloride, 2,3,5-tri-O-benzoyl-2-C-n-butyl-D-ribofuranosyl chloride,
2,3,5-tri-O-benzoyl-3-C-methyl-D-ribofuranosyl chloride,
2,3,5-tri-O-benzoyl-3-C-ethyl-D-ribofuranosyl chloride,
2,3,5-tri-O-acetyl-2-C-methyl-D-ribofuranosyl bromide,
2,3,5-tri-O-benzoyl-2-C-methyl-D-ribofuranosyl bromide,
2,3,5-tri-O-p-nitrobenzoyl-2-C-methyl-D-ribofuranosyl bromide,
2,3,5-tri-O-benzoyl-2-C-ethyl-D-ribofuranosyl bromide,
2,3,5-tri-O-benzoyl-3-C-methyl-D-ribofuranosyl bromide,
and 2,3,5-tri-O-benzoyl-3-C-ethyl-D-ribofuranosyl bromide.

Flow Sheet I illustrates the preparation of the 2,3,5-tri-O-acyl-2-C-methyl-D-ribofuranosyl halide intermediates starting from the known 2-C-methyl-D-ribono-γ-lactone (E. Peligot, Compt. rend. 89, 918 (1879)).

FLOW SHEET I

Preparation of 2-methylribofuranosyl halide intermediates

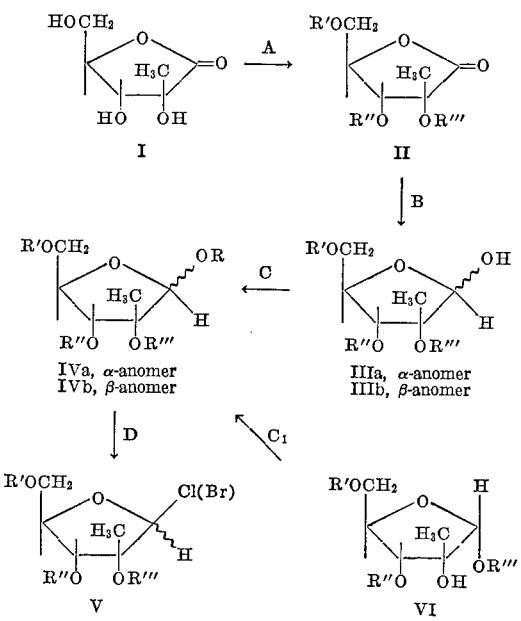

wherein

R', R'' and R''' are acyl groups selected from the group consisting of lower alkanoyl, benzoyl and substituted benzoyl; and
R is lower alkyl, or acyl as heretofore defined.

In Step A of this procedure, 2-C-methyl-D-ribono-γ-lactone is converted into its 2,3,5-tri-O-acyl derivative (II). The latter compound is then reduced with a dialkyl borane in Step B to produce as the main product an anomeric mixture of 2,3,5-tri-O-acyl-2-C-methyl-D-ribofuranose (III), along with an anomeric mixture of the 3,5-di-O-acyl-2-C-methyl-D-ribofuranose.

Attempts to separate the α and β-anomers of III by chromatography on acid washed alumina or silica gel leads to a rearrangement to the 1,3,5-tri-O-acyl-2-C-methyl-α-D-ribofuranose (VI). In Step C, further acylation of the mixed anomers of the 2,3,5-tri-O-acyl-(or 3,5-di-O-acyl)-2-C-methyl-D-ribofuranose (III), the 3,5-di-O-acyl-2-C-methyl-D-ribofuranose, or of the rearranged product 1,3,5-tri-O-acyl-2-C-methyl-α-D-ribofuranose (VI), leads to a 1,2,3,5-tetra-O-acyl-2-C-methyl-α(β)-D-ribofuranose (IV).

In Step D, the ribofuranose (IV) is converted into the ribofuranosyl halide (V) by a halogenation replacement reaction in a suitable solvent. Although the anomers of IV may be separated, the same halo sugar (V) is usually obtained from either the α or β-anomer of IV, or a mixture of the two anomers.

In Steps A and C, the preferred acylating agents are the acid halides and anhydrides containing the appropriate acyl residue. Thus, there may be employed alkanoyl, benzoyl, and substituted benzoyl halides, or appropriate acid anhydrides. These are exemplified by acetyl chloride, acetyl bromide, propionyl chloride, acetic anhydride, propionic acid anhydride, butyric acid anhydride, benzoyl bromide, benzoyl chloride, toluoyl chloride, p-methoxybenzoyl bromide, p-nitrobenzoyl bromide and p-nitrobenzoyl chloride. The preferred procedures are benzoylation with benzoyl chloride, or acetylation with acetic anhydride. It is preferred to run the acylation in the presence of a solvent, and when the reaction involves the evolution of a hydrogen halide or other acidic product, a basic solvent is usually employed; for example, tertiary amine type solvents such as pyridine, N,N-diethyl-aniline and triethylamine. However, other vehicles such as water and benzene may be used in conjunction with either organic or inorganic bases and will produce suitable results. The temperature is not critical for acylation of the 3 - (secondary) or 5 - (primary) - hydroxyl groups, however an elevated temperature is required for acylation of the tertiary hydroxyl group at the 2-position. Temperatures from 15° C. to 100° C. may be employed.

After the reaction is complete, products are preferably extracted into a selective solvent such as an ether, ester, or a halogenated aliphatic solvent, represented by chloroform, ethylene chloride, and the like. The extract may then be concentrated to yield the final acylated product. The alkanoyl, benzoyl and substituted-benzoyl ribofuranoses prepared according to these steps are novel compounds.

In Step B, the carbonyl group at the 1-position is reduced to a hydroxyl group, preferably with a dialkyl borane, for example, bis(3-methyl-2-butyl)-borane, (di-secondary-isoamyl borane). The lactone is suitably dissolved in an anhydrous solvent at about 0° C., preferably under an inert atmosphere, and the reducing agent is added gradually over several hours at 0° to 25° C. Other reducing agents which may be used include sodium borohydride, or sodium amalgam. Electrolytic reduction can also be employed.

Reduction of the 2,3,5-tri-O-acyl-2-C-methyl-D-ribono-γ-lactone (II) with bis(3-methyl-2-butyl)-borane gives 2,3,5 - tri - O-acyl-2-C-methyl-α(and β)-D-ribofuranose (III) as the main product. 3,5-di-O-acyl-2-C-methyl-α (and β)-D-ribonfuranose is also obtained. The separation of the α and β-anomers of 2,3,5-tri-O-benzoyl-2-C-methyl-D-ribofuranose on acid washed alumina results in an almost complete rearrangement to 1,3,5-tri-O-benzoyl-2-C-methyl-α-D-ribofuranose (VI). The same rearrangement occurs, but only to a slight extent, during chromatography of the reduction products on silica gel. The rearranged product can be used to put other types of acyl groups in the 2-position.

In Step D of the process, the 1,2,3,5-tetra-O-acyl-2-C-methyl-D-ribofuranose obtained from Step C is treated under anhydrous conditions to introduce a halogen atom at the 1-carbon position of the compound, using an agent which yields a halogen anion in the presence of a strong acid. Such agents as hydrogen bromide, hydrogen chloride, thionyl bromide, thionyl chloride, metal halides, and the like are suitable, with hydrogen chloride and hydrogen bromide being preferred. In the case of hydrogen halides, these reagents act as both the source of the halogen anion and the strong acid. The temperature of the reaction is not critical and good results are obtained at from 0° to 25° C. Temperatures outside the range may be employed with due consideration given to stability and economics. The preferred operating temperature is about 15° to 20° C. With the β-anomer, the reaction proceeds easily and is complete in about 20 minutes, up to 2 hours. The reaction proceeds with more difficulty with the α-anomer and may require several days. When reaction is complete, the products are concentrated and excess solvent removed at reduced pressure. It is preferred to employ inert solvents, but the use of solvents is not critical. Such solvents as ethers, aromatic hydrocarbons, such as benzene, toluene, xylene, chlorinated hydrocarbons, especially lower aliphatic acids such as acetic acid, and the like are suitable.

In a preferred procedure, the ribofuranose compound is treated with etheral hydrogen chloride (or bromide) or in acetic acid solution to which a small quantity of acetyl chloride (bromide) has been added. Reaction of the α-anomer with the halogen halide in ether alone proceeds too slowly and may result in incomplete conversion, whereas reaction of the β-anomer with halogen halide proceeds readily. In the case of the α-anomer, it is preferred to carry out the conversion to the halide in two steps; first, with a solution of halogen halide in acetic acid, and after removal of the reagent, by a second reaction with hydrogen halide in ether.

Flow Sheet II illustrates the preparation of the 2,3,5-tri-O-acyl-2-lower-alkyl-D-ribofuranosyl halide intermediates, starting from a 2,3,5-tri-O-acyl-D-ribofuranosyl halide.

FLOW SHEET II

Preparation of 2-C-alkyl-D-ribofuranosyl halide intermediates

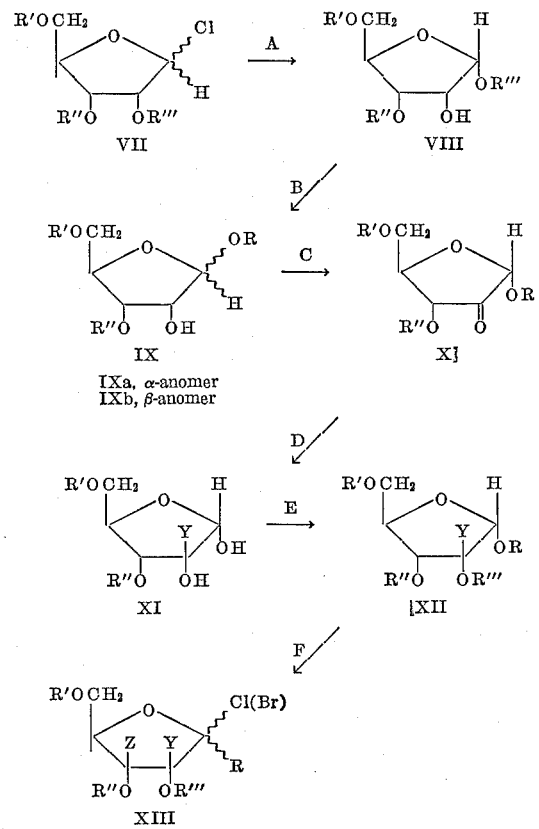

wherein

R', R'' and R''' are acyl groups selected from the group consisting of lower alkanoyl, benzoyl and sustituted benzoyl; and R and Y are each lower alkyl.

In Step A of this process, a 2,3,5-tri-O-acyl-D-ribofuranosyl halide (VII) where the acyl group is lower alkanoyl, benzoyl or benzoyl substituted by one or more lower alkyl, lower alkoxy, halo or nitro groups, is converted into the 1,3,5-tri-O-acyl-α-D-ribofuranose (VIII) by adding an aqueous acetone solution to the halogenose (VII) and permitting the mixture to stand for about an hour at a temperature from about 5° to 50° C. The speed of the reaction will be greater at the higher temperature. A solution of approximately 4 to 6 parts (v./v.) of water in acetone is preferred, although the concentration is not critical. A greater proportion of water will tend to hydrolyze the halogen group at the 1-position also, giving a more unfavorable mixture of products. The product is suitably recovered by methods known in the art.

In Step B, the 1,3,5-tri-O-acyl-α-D-ribofuranose (VIII) is treated with HCl and a lower alkanol to obtain the corresponding alkyl 3,5-di-O-acyl-α-(and β)-D-ribofuranoside (IX). This reaction suitably takes place at a temperature of from 5° to 50° C., a temperature of 25° C. being preferred. Other mineral acids such as HBr or sulfuric acid may also be employed. Although methanol is preferred, other lower alkanols may be used. The α and β-anomers are separated by chromatography on silica gel.

The alkyl 3,5-di-O-acyl-α-D-ribofuranoside (IX) is then oxidized to the alkyl 3,5-di-O-acyl-α-D-erythropentofuran-2-uloside (X) in Step C. Suitable oxidizing agents are ruthenium tetroxide, chromium trioxide in pyridine, or dimethyl sulfoxide in acetic acid or acetic anhydride. Using ruthenium tetroxide, oxidation takes place conveniently at room temperature, although tempertures within the range of 5° to 50° C. may be employed.

In Step D, the alkyl 3,5-di-O-acyl-α-D-erythro-pentofuran-2-uloside (X) is reacted with a Grignard reagent in essentially stoichiometric proportions at a temperature range of from 5° to about 80° C. for a time period of a few minutes to several hours, thereby forming a 3,5-di-O-acyl-2-C-lower-alkyl - α - D - ribofuranoside (XI). Examples of Grignard reagents used in this reaction are methyl magnesium bromide, ethyl magnesium chloride, propyl magnesium iodide, and the like.

The alkyl 3,5-di-O-acyl-C-lower-alkyl-α-D-ribofuranoside (XI) is acylated to the alkyl 2,3,5-tri-O-acyl-C-lower-alkyl-α-D-ribofuranoside (XII) in Step E at an elevated temperature. Temperatures within the range of about 40° to 100° C. are suitable, using as the acylating agent an acyl halide or an acid anhydride in the presence of an organic base such as pyridine, dimethylaniline, N-methylmorpholine or the like, or an inorganic base such as sodium acetate in an inert solvent such as benzene, dioxane, or tetrahydrofuran.

The methyl 2,3,5 - tri - O-benzoyl-2-C-lower-alkyl-α-D-riboside (XII) is converted to the halo sugar (XIII) in Step F by a halogen replacement reaction utilizing the desired hydrogen halide in acetic acid. This replacement reaction takes place at a temperature of from about 5° to 30° C. for about 5 to 24 hours.

Flow Sheet III illustrates the preparation of the 2,3,5-tri-O-acyl-3-lower-alkyl-D-ribofuranosyl halide intermediates starting from a 1,2-O-isopropylidene-5-O-acyl-α-D-erythro-pentofuran-3-ulose.

FLOW SHEET III

Preparation of 3-lower-alkyl-D-ribofuranosyl halide intermediates

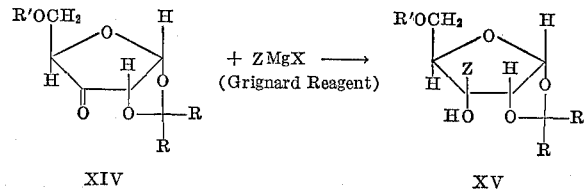

Intermediate compounds XV, which are novel compounds, are further then reacted in Step B by either of two methods, $B_a$ or $B_b$.

Step B
Method $B_a$

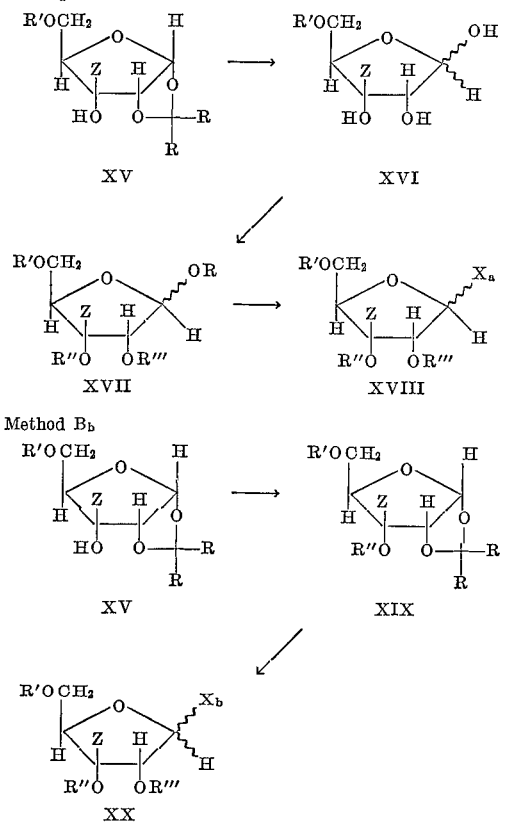

Method $B_b$ wherein

R and Z are lower alkyl;

R′, R″ and R‴ are each hydrogen or an acyl residue of an organic acid selected from the group consisting of lower alkanoyl, benzoyl or substituted benzoyl; and $X_a$ is halogen or hydroxy and $X_b$ is acyl as heretofore defined.

The intermediates of Flow Sheet III are prepared by first treating a 5-O-acyl-1,2-O-isopropylidene-D-erythro-pentofuran-3-ulose (XIV) with a Grignard reagent, thereby forming a 5-O-acyl-1,2-isopropylidene-3-lower-alkyl-D-ribofuranose (XV). This latter compound is then treated by either of two methods to obtain the novel compounds of the present invention. In the first method, the 5-O-acyl-1,2-O-isopropylidene-3-lower-alkyl - D - ribofuranose (XV) is subjected to acidic alcoholysis to produce an alkyl 5-O-acyl-3-lower-alkyl-D-ribofuranoside which is acylated to the alkyl 2,3,5-tri-O-acyl-3-lower-alkyl-D-ribofuranoside (XVI). This ribofuranoside may then be converted to the free sugar employing a basic solvolysis followed by a further hydrolysis by strong acid in an aqueous medium, or it may be converted to the halogenose by a halogen replacement reaction in an appropriate solvent. In the second method, the 5-O-acyl-1,2-O-isopropylidene-3-lower-alkyl-D-ribofuranose (XVI) is acylated under basic conditions to form the 3,5-di-O-acyl-1,2-O-isopropylidene - 3 - lower-alkyl-D-ribofuranose (XIX), which is then hydrolyzed in a strong acid and further acylated in an appropriate solvent to give the compounds (XX) of the present invention where X, R′, R″ and R‴ are acyl groups.

More specifically, the 3-C-lower-alkylribofuranosyl halide compounds of the present invention are obtained by reacting a 5-O-acyl-1,2-O-isopropylidene-D-erythropentofuran-3-ulose with a Grignard reagent in essentially stoichiometric proportions at a temperature range of from 5° C. to about 80° C. for a period of a few minutes to about five hours, thereby forming a 5-O-acyl-1,2-O-isopropylidene - 3 - C-lower-alkyl-D-ribofuranose. The Grignard reagents used in this reaction are lower alkyl magnesium halides. Examples of Grignard reagents are methyl magnesium bromide, ethyl magnesium bromide, methyl magnesium chloride, ethyl magnesium chloride, methyl magnesium iodide, ethyl magnesium iodide and propyl magnesium bromide.

In one aspect of the present invention, Method $B_a$ is followed, and compounds (XVIII), in which X is hydroxy or halogen, are obtained. In this method, the 5-O-acyl-1,2 - O - isopropylidene-3-C-lower-alkyl-D-ribofuranose is subjected to an acidic alcoholysis by reaction with a strong acid such as hydrochloric acid, hydrobromic acid, or sulfuric acid and a lower alkanol at a temperature range of 5° C. to about 60° C. for a period of time from about a few minutes to about 5 hours to produce an alkyl 5-O-acyl-3-C-lower-alkyl-D-ribofuranoside. The latter compound is acylated under basic conditions with acylating agents such as an acyl halide or an acid anhydride. Examples of these acylating agents are benzoyl chloride, benzoyl bromide, p-nitrobenzoyl chloride, acetic anhydride and propionic anhydride. This acylation step is carried out at a temperature range of from about 20° C. to about 100° C. for a time period of from about 2 to 72 hours, and the alkyl 2,3,5-tri-O-acyl-3-C-lower-alkyl-D-ribofuranoside is formed. The ribofuranoside may then be converted to the free sugar by a basic solvolysis, that is, by treatment with a lower alkanol at a temperature range of between 15° C. to about 60° C., followed by a further hydrolysis with a strong acid such as hydrochloric acid, hydrobromic acid, or sulfuric acid in an aqueous medium. This acid hydrolysis step is carried out at a temperature range of from about 5° C. to about 50° C. for about 2 hours to about 24 hours. Alternatively, the ribofuranoside may be converted to the halo sugar by a halogen replacement reaction utilizing the desired hydrogen halide in an appropriate solvent such as acetic acid, methylene chloride, tetrachloroethane, or propionic acid. This replacement reaction takes place at a temperature of from about 5° C. to 30° C.

In another aspect of the present invention, Method $B_b$ is followed, and compounds (XX) are obtained in which an acyl group is at the 1-position. In this method, the 5-O-acyl-1,2-O-isopropylidene-3-lower-alkyl-D-ribofuranose is acylated at a temperature range of about 20° C. to 100° C. for a period of time from about 2 to about 72 hours under basic conditions to form a 3,5-di-O-acyl-1,2-O-isopropylidene - 3 - lower-alkyl-D-ribofuranose. The acylating agent may be an acyl halide or an anhydride such as benzoyl chloride, benzoyl bromide, p-nitrobenzoyl chloride, acetic anhydride, or propionic anhydride. The basic condition is provided by a base such as pyridine, dimethylaniline, N-methylmorpholine or sodium acetate in an inert solvent such as benzene, dioxane, or tetrahydrofuran. The 3,5-di-O-acyl-1,2-O-isopropylidene-3-lower-alkyl-D-ribofuranose is then hydrolyzed in a strong acid such as hydrochloric acid, hydrobromic acid, or sulfuric acid, and further acylated with an anhydride such as acetic anhydride, propionic anhydride, or butyric anhydride, to form the compounds (XX) of the present invention. This hydrolysis-acylation reaction is carried out at a temperature of about 5° C. to 50° C. for about 2 to 20 hours. All reactions are carried out in essentially stoichiometric proportions. The alkyl 2,3,5-tri-O-acyl-2(or 3)-C-lower-alkyl-D-ribofuranoside is converted into the corresponding 2(or 3)-C-lower-alkyl-D-ribofuranose by treatment with barium hydroxide in a lower alkanol, preferably methanol, to remove the acyl grouping, followed by an acidic hydrolysis to cleave the glycosidic alkyl.

The novel purine nucleosides containing a branched-chain in the sugar moiety are the α and β isomers of the nucleosides represented by Formula A:

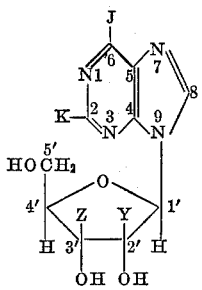

wherein

J and K may be the same or different, hydrogen, lower alkyl, halogen, mercapto, lower-alkyl mercapto, amino, or lower-alkyl substituted amino, provided that when J is amino and K is hydroxy, the ribofuranoyl moiety may also be joined to the purine at the 7-position; and Y and Z are each lower alkyl or hydrogen, provided that when Y is lower alkyl Z is hydrogen, and when Y is hydrogen Z is lower alkyl.

The compounds are termed generally 2-K-6-J-9-(2[or 3]-lower-alkyl-D-ribofuranosyl)purines, although also included within the scope of the invention is the 7-isomer of compounds having structure (A) when J is hydroxy and K is amino.

Representative of the novel purine nucleoside compounds of the present invention, but not limited to these compounds, are:

9-(2-C-methyl-D-ribofuranosyl)purine
9-(2-C-methyl-D-ribofuranosyl)-2-methylpurine
9-(2-C-methyl-D-ribofuranosyl)-6-methylpurine
9-(2-C-methyl-D-ribofuranosyl)-2,6-dimethylpurine
9-(2-C-methyl-D-ribofuranosyl)-2-ethylpurine
9-(2-C-methyl-D-ribofuranosyl)-6-ethylpurine
9-(2-C-methyl-D-ribofuranosyl)-2,6-diethylpurine
9-(2-C-methyl-D-ribofuranosyl)-2-aminopurine
9-(2-C-methyl-D-ribofuranosyl)-6-aminopurine
9-(2-C-methyl-D-ribofuranosyl)-2,6-diaminopurine
9-(2-C-methyl-D-ribofuranosyl)-2-methylaminopurine
9-(2-C-methyl-D-ribofuranosyl)-6-methylaminopurine
9-(2-C-methyl-D-ribofuranosyl)-2,6-dimethylaminopurine
9-(2-C-methyl-D-ribofuranosyl)-6-ethylaminopurine
9-(2-C-methyl-D-ribofuranosyl)-2-hydroxypurine
9-(2-C-methyl-D-ribofuranosyl)-6-hydroxypurine
9-(2-C-methyl-D-ribofuranosyl)-2-methyl-6-aminopurine
9-(2-C-methyl-D-ribofuranosyl)-2-methylamino-6-methylpurine
9-(2-C-methyl-D-ribofuranosyl)-2-methyl-6-hydroxypurine
9-(2-C-methyl-D-ribofuranosyl)-2-hydroxy-6-methylpurine
9-(2-C-methyl-D-ribofuranosyl)-2-amino-6-hydroxypurine
9-(2-C-methyl-D-ribofuranosyl)-2-hydroxy-6-aminopurine
9-(2-C-methyl-D-ribofuranosyl)-2-methylamino-6-hydroxypurine
9-(2-C-methyl-D-ribofuranosyl)-2-dimethylaminopurine
9-(2-C-methyl-D-ribofuranosyl)-6-dimethylaminopurine
9-(2-C-methyl-D-ribofuranosyl)-2-mercaptopurine
9-(2-C-methyl-D-ribofuranosyl)-6-mercaptopurine
9-(2-C-methyl-D-ribofuranosyl)-6-methylmercaptopurine
9-(2-C-methyl-D-ribofuranosyl)-2,6-dimercaptopurine
9-(2-C-methyl-D-ribofuranosyl)-2-methyl-6-mercaptopurine
9-(2-C-methyl-D-ribofuranosyl)-2,6-dichloropurine
9-(2-C-methyl-D-ribofuranosyl)-2-chloropurine
9-(2-C-methyl-D-ribofuranosyl)-2-bromopurine
9-(2-C-methyl-D-ribofuranosyl)-6-bromopurine
9-(2-C-methyl-D-ribofuranosyl)-6-chloropurine
9-(2-C-methyl-D-ribofuranosyl)-2,6-dibromopurine
9-(2-C-methyl-D-ribofuranosyl)-6-amino-2-fluoropurine
9-(2-C-methyl-D-ribofuranosyl)-6-amino-2-chloropurine
9-(2-C-ethyl-D-ribofuranosyl)-2-methylpurine
9-(2-C-ethyl-D-ribofuranosyl)-6-aminopurine
9-(2-C-ethyl-D-ribofuranosyl)-2,6-diaminopurine
9-(2-C-ethyl-D-ribofuranosyl)-6-methylaminopurine
9-(2-C-ethyl-D-ribofuranosyl)-2,6-dimethylaminopurine
9-(2-C-ethyl-D-ribofuranosyl)-6-ethylaminopurine
9-(2-C-ethyl-D-ribofuranosyl)-2-amino-6-hydroxypurine
9-(2-C-ethyl-D-ribofuranosyl)-6-mercaptopurine
9-(2-C-ethyl-D-ribofuranosyl)-2-methyl-6-mercaptopurine
9-(2-C-ethyl-D-ribofuranosyl)-6-chloropurine
9-(2-C-ethyl-D-ribofuranosyl)-6-amino-2-fluoropurine
9-(3-C-methyl-D-ribofuranosyl)-6-methylpurine
9-(3-C-methyl-D-ribofuranosyl)-6-aminopurine
9-(3-C-methyl-D-ribofuranosyl)-2,6-diaminopurine
9-(3-C-methyl-D-ribofuranosyl)-6-methylaminopurine
9-(3-C-methyl-D-ribofuranosyl)-2,6-dimethylaminopurine
9-(3-C-methyl-D-ribofuranosyl)-6-ethylaminopurine
9-(3-C-methyl-D-ribofuranosyl)-2-amino-6-hydroxypurine
9-(3-C-methyl-D-ribofuranosyl)-6-mercaptopurine
9-(3-C-methyl-D-ribofuranosyl)-2-methyl-6-mercaptopurine
9-(3-C-methyl-D-ribofuranosyl)-6-chloropurine
9-(3-C-methyl-D-ribofuranosyl)-6-amino-2-fluoropurine
9-(3-C-ethyl-D-ribofuranosyl)-6-methylpurine
9-(3-C-ethyl-D-ribofuranosyl)-6-aminopurine
9-(3-C-ethyl-D-ribofuranosyl)-2,6-diaminopurine
9-(3-C-ethyl-D-ribofuranosyl)-6-methylaminopurine
9-(3-C-ethyl-D-ribofuranosyl)-2,6-dimethylaminopurine
9-(3-C-ethyl-D-ribofuranosyl)-6-ethylaminopurine
9-(3-C-ethyl-D-ribofuranosyl)-2-amino-6-hydroxypurine
9-(3-C-ethyl-D-ribofuranosyl)-6-mercaptopurine
9-(3-C-ethyl-D-ribofuranosyl)-2-methyl-6-mercaptopurine
9-(3-C-ethyl-D-ribofuranosyl)-6-chloropurine
9-(3-C-ethyl-D-ribofuranosyl)-6-amino-2-fluoropurine In general, the above 2-, 6-, or 2,6-substituted purine nucleosides containing a branched-chain at the 2'- or 3'-position of the sugar moiety, are prepared by reacting a a 2,3,5-tri-0-acyl-D-ribofuranosyl halide

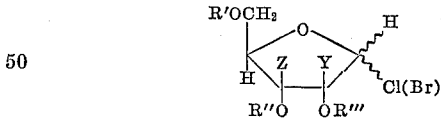

where

R', R" and R'" may be the same or different, acyl group selected from the group consisting of lower alkanoyl, benzoyl or substituted benzoyl; and Y and Z are hydrogen or lower alkyl but Y is lower alkyl when Z is hydrogen, and Z is lower alkyl when Y is hydrogen.

with a chloromercuri 2,6-substituted purine of the formula

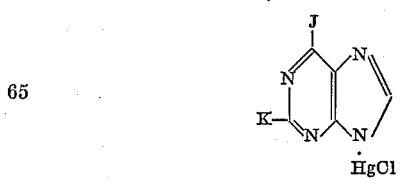

where

J and K may be the same or different, hydrogen, lower alkyl, halogen, lower acylamino or acyl-lower-alkyl substituted-amino groups.

The reaction proceeds essentially stoichiometrically at a temperature range of about 25° C. to about 150° C., and preferably between about 100° C. and 140° C. In this step, the reaction as carried out in an appropriate solvent. The selection of the solvent is not important so long as it is an inert solvent and boils in a range of about 25° C. to 150° C. Examples of such solvents are benzene, dibutyl ether, cyclohexane, toluene, xylene, and the like. The preferred solvents are toluene and xylene. The reaction is normally complete in about 15 minutes to about 5 hours, depending on the reaction temperature. After obtaining the intermediate reaction product, the compounds are then further treated as described below, as necessary to obtain the desired 2,6-substituents in the purine portion of the nucleoside.

In the case of solvolysis, for example, to convert a 6-benzamido group to a 6-amino group, the reaction is carried out in the presence of a basic catalyst in an appropriate solvent at a temperature range of from about 5° C. to about 150° C., and preferably about 65° C. to about 90° C. in a reaction time of from about 15 minutes to about 5 hours. The length of reaction time is dependent upon the temperature, the catalyst and solvent used. Examples of basic catalysts are alkali and alkaline earth bases and their corresponding alkoxides, solutions of ammonia, amines and substituted amines. Examples of the solvents are lower alcohols. The preferred solvent is methanol. In this treatment, the acyl blocking groups will also be removed.

In the case of aminolysis, for example, to convert a 6-halo-substituent to a 6-amino-substituent, the reaction is carried out in the presence of ammonia, a monoalkyl or a dialkylamine at a temperature range of from about 25° C. to about 150° C., and preferably about 85° C. to about 110° C. for a reaction time of from about 15 minutes to about 5 hours. Examples of amines are methylamine, dimethylamine, ethylamine, diethylamine, propylamine and dipropylamine. Reactions with ammonia, or with a lower boiling amine such as methylamine, are carried out in a sealed reaction vessel to prevent loss of the volatile reagent at the temperatures indicated. In this treatment, the acyl blocking groups will also be removed.

In the case of mercaptolysis, for example, of a 6-halo-substituent, the reaction is carried out in the presence of thiourea or a metal salt of a lower alkyl mercaptan at a temperature range of from about 25° C. to about 150° C., and preferably about 65° C. to about 90° C., and a reaction time of from about 15 minutes to about 5 hours. Examples of the alkali or alkaline earth metal salts of alkyl mercaptans are sodium methylmercapton, sodium ethylmercaptan, sodium isopropylmercaptan, potassium methylmercaptan and calcium methylmercaptan.

When the mercaptolysis reactant is thiourea, the acyl blocking groups are not removed at R', R" and R"' portions, and the resulting intermediate must be subjected to basic solvolysis in order to obtain the mercapto compounds of the invention.

The compound where both K and L are hydrogen, is obtained from the 9-(2,3,5-tri-O-acyl-2[or 3]-lower-alkyl-D-ribofuranosyl)-6-halopurine by hydrogenation in the presence of a palladium catalyst at a temperature of from room temperature up to about 80° C. The temperature is not critical, although a slightly elevated temperature is preferred. The hydrogenation is carried out in the presence of an inert solvent such as methanol, ethanol, dioxane, and the like. Such treatment removes a chloro or bromo atom at the 6-position. The R', R", and R"' acyl groups present at the 2,3,5-positions are then removed, for example, by treatment with an alkali metal alkoxide solution as previously described.

The 2' (or 3')-C-lower-alkyl ribofuranosyl nucleosides having the 2-fluoro-6-amino-substituents in the purine nucleus are prepared by a diazotization reaction from the 9-(2-[or 3]-C-lower-alkyl-D-ribofuranosyl)-2,6-diaminopurine.

The novel 2(1H)-pyrimidinone nucleosides containing a branched-chain in the sugar moiety are represented by the following structural formulas (B):

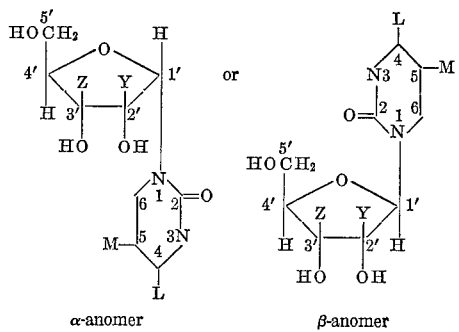

α-anomer    β-anomer wherein
L and M may be the same or different, lower alkoxy, hydroxy, amino, or lower-alkyl substituted amino, and, in addition, M may also be hydrogen, lower alkyl, halogen or halogenated lower alkyl, especially trifluoromethyl; and Y and Z are each hydrogen or lower alkyl, provided that when Y is hydrogen Z is lower alkyl, and when Y is lower alkyl Z is hydrogen.

Typical of the L and M groups, which may be the same or different in the compounds of the present invention, are lower alkoxy radicals such as methoxy, ethoxy or propoxy; hydroxy; amino and lower-alkyl substituted amino such as methylamina, dimethylamino, ethylamino, diethylamino, propylamino or dipropylamino. In addition, M may also be hydrogen; a lower alkyl radical such as methyl, ethyl or propyl; a halogen such as chlorine, bromine, iodine or fluorine, and a halogenated alkyl, especially trifluoromethyl.

Representative of the novel compounds obtained by the method of the present invention, but not limited to these compounds, are the α and β forms of 1-(2-[or 3]-C-methyl-D-ribofuranosyl)-4-methoxy-2(1H)-pyrimidinone;

1-(2[or 3]-C-methyl-D-ribofuranosyl)-4-ethoxy-2(1H)-pyrimidinone;

1-(2[or 3]-C-methyl-D-ribofuranosyl)-4-propoxy-2(1H)-pyrimidinone;

1-(2[or 3]-C-methyl-D-ribofuranosyl)-4-hydroxy-5-chloro-2(1H)-pyrimidinone;

1-(2[or 3]-C-methyl-D-ribofuranosyl)-4-amino-5-trifluoromethyl-2(1H)-pyrimidinone;

1-(2[or 3]-C-methyl-D-ribofuranosyl)-4-hydroxy-5-trifluoromethyl-2(1H)-pyrimidinone;

1-(2[or 3]-C-methyl-D-ribofuranosyl)-4-hydroxy-5-bromo-2(1H)-pyrimidinone;

1-(2[or 3]-C-methyl-D-ribofuranosyl)-4-hydroxy-5-iodo-2(1H)-pyrimidinone;

1-(2[or 3]-C-methyl-D-ribofuranosyl)-4-hydroxy-5-fluoro-2(1H)-pyrimidinone;

1-(2[or 3]-C-methyl-D-ribofuranosyl)-4-amino-2(1H)-pyrimidinone;

1-(2[or 3]-C-methyl-D-ribofuranosyl)-4-methylamino-2(1H)-pyrimidinone;

1-(2[or 3]-C-methyl-D-ribofuranosyl)-4-dimethylamino-2(1H)-pyrimidinone;

1-(2[or 3]-C-methyl-D-ribofuranosyl)-4-diethylamino-2(1H)-pyrimidinone;

1-(2[or 3]-C-methyl-D-ribofuranosyl)-4,5-dimethoxy-2(1H)-pyrimidinone;

1-(2[or 3]-C-methyl-D-ribofuranosyl)-4-methoxy-5-chloro-2(1H)-pyrimidinone;

1-(2[or 3]-C-methyl-D-ribofuranosyl)-4-methoxy-5-fluoro-2(1H)-pyrimidinone;

1-(2[or 3]-C-methyl-D-ribofuranosyl)-4-hydroxy-5-methyl-2(1H)-pyrimidinone;

1-(2[or 3]-C-methyl-D-ribofuranosyl)-4-hydroxy-5-ethyl-2(1H)-pyrimidinone;

1-(2[or 3]-C-methyl-D-ribofuranosyl)-4-amino-5-methyl-2(1H)-pyrimidinone;
1-(2[or 3]-C-methyl-D-ribofuranosyl)-4-amino-5-ethyl-2(1H)-pyrimidinone;
1-(2[or 3]-C-methyl-D-ribofuranosyl)-4-methoxy-5-methyl-2(1H)-pyrimidinone;
1-(2[or 3]-C-methyl-D-ribofuranosyl)-4-ethoxy-5-methyl-2(1H)-pyrimidinone;
1-(2[or 3]-C-methyl-D-ribofuranosyl)-4-methoxy-5-ethyl-2(1H)-pyrimidinone;
1-(2[or 3]-C-methyl-D-ribofuranosyl)-4-ethoxy-5-ethyl-2(1H)-pyrimidinone;
1-(2[or 3]-C-methyl-D-ribofuranosyl)-4-amino-5-bromo-2(1H)-pyrimidinone;
1-(2[or 3]-C-methyl-D-ribofuranosyl)-4-amino-5-fluoro-2(1H)-pyrimidinone;
1-(2[or 3]-C-methyl-D-ribofuranosyl)-4-hydroxy-5-amino-2(1H)-pyrimidinone;
1-(2[or 3]-C-methyl-D-ribofuranosyl)-4-hydroxy-5-methylamino-2(1H)-pyrimidinone;
1-(2[or 3]-C-methyl-D-ribofuranosyl)-4-hydroxy-5-dimethylamino-2(1H)-pyrimidinone;
1-(2[or 3]-C-ethyl-D-ribofuranosyl)-4-methoxy-2(1H)-pyrimidinone;
1-(2[or 3]-C-ethyl-D-ribofuranosyl)-4-ethoxy-2(1H)-pyrimidinone;
1-(2[or 3]-C-ethyl-D-ribofuranosyl)-4-propoxy-2(1H)-pyrimidinone;
1-(2[or 3]-C-ethyl-D-ribofuranosyl)-4-hydroxy-5-chloro-2(1H)-pyrimidinone;
1-(2[or 3]-C-ethyl-D-ribofuranosyl)-4-amino-5-trifluoromethyl-2(1H)-pyrimidinone;
1-(2[or 3]-C-ethyl-D-ribofuranosyl)-4-hydroxy-5-trifluoromethyl-2(1H)-pyrimidinone;
1-(2[or 3]-C-ethyl-D-ribofuranosyl)-4-hydroxy-5-bromo-2(1H)-pyrimidinone;
1-(2[or 3]-C-ethyl-D-ribfouranosyl)-4-hydroxy-5-iodo-2(1H)-pyrimidinone;
1-(2[or 3]-C-ethyl-D-ribofuranosyl)-4-hydroxy-5-fluoro-2(1H)-pyrimidinone;
1-(2[or 3]-C-ethyl-4-ribofuranosyl)-4-amino-2(1H)-pyrimidinone;
1-([or 3]-C-ethyl-D-ribofuranosyl)-4-methylamino-2(1H)-pyrimidinone;
1-(2[or 3]-C-ethyl-D-ribofuranosyl)-4-dimethylamino-2(1H)-pyrimidinone;
1-(2[or 3]-C-ethyl-D-ribofuranosyl)-4-diethylamino-2(1H)-pyrimidinone;
1-(2[or 3]-C-ethyl-D-ribofuranosyl)-4,5-dimethoxy-2(1H)pyrimidinone;
1-(2[or 3]-C-ethyl-D-ribofuranosyl)-4-methoxy-5-chloro-2(1H)-pyrimidinone;
1-(2[or 3]-C-ethyl-D-ribofuranosyl)-4-methoxy-5-fluoro-2(1H)-pyrimidinone;
1-(2[or 3]-C-ethyl-D-ribofuranosyl)-4-hydroxy-5-methyl-2(1H)-pyrimidinone;
1-(2[or 3]-C-ethyl-D-ribofuranosyl)-4-hydroxy-5-ethyl-2(1H)-pyrimidinone;
1-(2[or 3]-ethyl-D-ribofuranosyl)-4-amino-5-methyl-2(1H)-pyrimidinone;
1-(2[or 3]-C-ethyl-D-ribofuranosyl)-4-amino-5-ethyl 2(1H)-pyrimidinone;
1-(2[or 3]-C-ethyl-D-ribofuranosyl)-4-methoxy-5-methyl-2(1H)-pyrimidinone;
1-(2[or 3]-C-ethyl-D-ribofuranosyl)-4-ethoxy-5-methyl-2(1H)-pyrimidinone;
1-(2[or 3]-C-ethyl-D-ribofuranosyl)-4-methoxy-5-ethyl-2(1H)-pyrimidinone;
1-(2[or 3]-C-ethyl-D-ribofuranosyl)-4-ethoxy-5-ethyl-2(1H)-pyrimidinone;
1-(2[or 3]-C-ethyl-D-ribofuranosyl)-4-amino-5-bromo-2(1H)-pyrimidinone;
1-(2[or 3]-C-ethyl-D-ribofuranosyl)-4-amino-5-fluoro-2(1H)-pyrimidinone;
1-(2[or 3]-C-ethyl-D-ribofuranosyl)-4-hydroxy-5-amino-2(1H)-pyrimidinone;
1-(2[or 3]-C-ethyl-D-ribofuranosyl)-4-hydroxy-5-methylamino-2(1H)-pyrimidinone; and
1-(2[or 3]-C-ethyl-D-ribofuranosyl)-4-hydroxyl-5-dimethylamino-2(1H)-pyrimidinone.

Both α and β anomers of the compounds of the present invention are prepared by reacting a 2,4-dialkoxypyrimidine with a 2,3,5-tri-O-acyl-2-(or 3-C-lower-alkyl-D-ribofuranosyl halide to form a 1-(2,3,5-tri-O-acyl-2[or 3] - C - lower - alkyl - D-ribofuranosyl)-4-alkoxy-2(1H)-pyrimidinone. These intermediate compounds are then reacted with ammonia, or a primary or secondary amine to produce compounds (XXIV) wherein L is amino or substituted amino. The reaction product from Step A may also be hydrolyzed under acidic or basic conditions to produce compounds (XXIV) where L is hydroxy.

The reaction is illustrated by the following flow diagram:

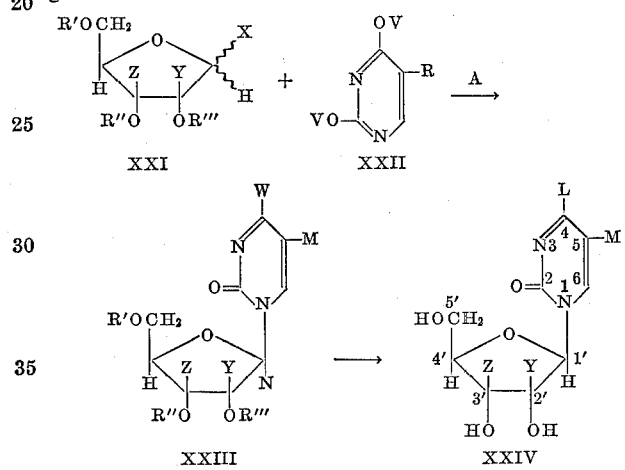

where

L and M are as previously defined;
X is a halogen in either the α or β configuration, or a combination of both;
V is lower alkyl;
W is lower alkoxy and/or hydroxy; and
R′, R″ and R‴ are acyl groups.

Examples of acyl groups are alkanoyl such as acetyl, propionyl or butyroyl; benzoyl; and benzoyl substituted by lower alkyl, alkoxy, halo or nitro groups. Solvents may be lower alkanols.

More specifically, the process of the present invention involves, in Step A, the reaction of an excess of a 2,4-dialkoxypyrimidine with a 2,3,5 - triacyl - 2 - (or 3) - C-lower - alkyl - D - ribofuranosyl halide at a temperature range of about 5° C. to about 120° C., and preferably between about 25° C. to about 60° C. until reaction is complete. In this step, the reaction is carried out in an appropriate solvent. The selection of the solvent is not important as long as it is an inert solvent. Examples of such solvents are methylene chloride, benzene, diethyl ether, dibutyl ether, dioxane, tetrahydrofuran, cyclohexane, and the like. The preferred solvent is methylene chloride. The reaction to produce the α and β-anomers (XIII) is normally complete in a few hours to several days, depending on the reaction temperature and the reactivity of the halogenose.

The reaction product from Step A, where W is lower alkoxy, is then reacted with ammonia, or a lower alkylamine such as methylamine, ethylamine, propylamine, or dimethylamine in Step B in an appropriate solvent at about the same temperature range as in Step A, to produce compound XXIV wherein L is amino or lower-alkyl amino.

The novel 2(1H)-pyrimidinone nucleosides can also be obtained by condensing the halo sugar reactant with a mercury complex of an appropriately substituted pyrimidine.

For the preparation of some of the novel compounds of the present invention, an additional step may be required. For example, the 5-halo-derivatives are obtained by halogenating the 1 - (2[or 3] - lower - alkyl - D - ribofuranosyl) - 4 - hydroxy - 2(1H) - pyrimidinone by methods known in the art for halogenating 1-(D-ribofuranosyl) 4 - hydroxy - 2-(1H) - pyrimidinone. The resulting 1 - (2-[or 3] - lower - alkyl - D - ribofuranosyl) - 5 - halo - 4-hydroxy - 2(1H) - pyrimidinone is then converted to the corresponding 1 - (2[or 3] - lower - alkyl - D - ribofuranosyl) - 4 - hydroxy - 5 - amino - 2(1H) - pyrimidinone by treatment with ammonia or a primary or secondary amine as heretofore described. For example, 1-(2-C-methyl) - D - ribofuranosyl - 4 - hydroxy - 5 - amino - 2 (1H)-pyrimidinone is preferably obtained by brominating 1 - (2 - methyl) - D - ribofuranosyl - 4 - hydroxy - 2 (1H)-pyrimidinone, and then reacting the resulting 1-(2-methyl) - D - ribofuranosyl - 4 - hydroxy - 5 - bromo - 2 (1H)-pyrimidinone with ammonia.

The following examples illustrate methods of carrying out the present invention, but it is to be understood that they are given for purposes of illustration and not of limitation.

EXAMPLE 1

2,3,5-tri-O-benzoyl-2-C-methyl-D-ribono-γ-lactone

A solution of 5 g. (30.8 mmoles) of 2-C-methyl-D-ribono-γ-lactone in 100 ml. of dry pyridine is cooled, stirred and treated with 17 ml. of benzoyl chloride. The mixture is heated at 65° to 70° C. for 4 hours and then cooled and stirred while 20 ml. of water is added. After 25 minutes, the mixture is concentrated to a thick semisolid which is dissolved in 100 ml. of chloroform and washed with three 50 ml. portions of 10% hydrochloric acid, two 50 ml. portions of 1 N sodium hydrogen carbonate and two 50 ml. portions of water. The dried chloroform layer is concentrated and the residue is crystallized from ether. The yield of 2,3,5-tri-O-benzoyl-2-C-methyl-D-ribono-γ-lactone in 10.8 g. (74%); M.P. 141–142° C.; $[\alpha]_D$ —79° (c. 1, chloroform);

$\lambda_{max.}^{Nujol}$ 5.57μ (lactone), 5.70 and 5.78μ (ester).

When 24 g. of p-nitrobenzoyl chloride is substituted for the benzoyl chloride used in the above procedure, 2,3,5 - tri - O - p - nitrobenzoyl - 2 - C - methyl - D-ribono-γ-lactone is obtained.

When 12 ml. of acetic anhydride is substituted for the benzoyl chloride used in the above procedure, 2,3,5-tri-O - acetyl - 2 - C - methyl - D - ribono - γ - lactone is obtained.

EXAMPLE 2

5-O-acetyl-3-O-benzoyl-2-O-p-nitrobenzoyl-D-ribono-γ-lactone

A solution of 5 g. (30.8 mmoles) of dry 2-C-methyl-D-ribono-γ-lactone in 100 ml. of dry pyridine is stirred, cooled to —20° C. and treated with 2.42 g. (30.8 mmoles) of acetyl chloride. After 30 minutes the reaction mixture is warmed to 0° C. and treated with 4.3 g. (30.8 mmoles) of benzoyl chloride. After an additional 90 minutes 5.7 g. (30.8 mmoles) of p-nitrobenzoyl chloride is added and the mixture is warmed to 65 to 70° C. for 4 hours. The mixture is concentrated at reduced pressure and the semisolid residue is dissolved in 200 ml. of chloroform and washed cold with three 50-ml. portions of 10% hydrochloric acid, two 50-ml. portions of 1 N sodium hydrogen carbonate and two 50-ml. portions of water. The dried chloroform layer is concentrated to a residue consisting predominately of 5-O-acetyl-3-O-bonzoyl-2-O-p-nitrobenzoyl-D-ribono-γ-lactone which may be further purified by chromatography on 750 g. of silica gel in mixtures of benzene and ethyl acetate.

EXAMPLE 3

2,3,5-tri-O-benzoyl - 2 - C - methyl - α(and β) - D-ribofuranose and 3,5-di-O-benzoyl - 2 - C - methyl-α(and β)-D-ribofuranose To a stirred solution of 30 g. (63 mmoles) of 2,3,5-tri-O-benzoyl-2-C-methyl-D-ribono-γ-lactone in 125 ml. of dry tetrahydrofuran at 0° C. under a nitrogen atomsphere is added dropwise 175 ml. of 1 M bis(3-methyl-2-butyl)-borane. After 16 hours at 25° C., the reaction solution is cooled to 0° C. and 26 ml. of water is carefully added. After the evolution of gas has subsided, the mixture is refluxed for 30 minutes. The mixture is concentrated, and the residual oil is dissolved in 250 ml. of acetone and 75 ml. of water. The solution is cooled (0° to 5° C.) and stirred during the dropwise addition of 33 ml. of 30% hydrogen peroxide while maintaining the pH between 7 and 8 by the addition of 3 N sodium hydroxide. The excess hydrogen peroxide is decomposed at 25° C. by the cautious addition of 500 mg. of 5% platinum on carbon. Stirring is continued until the evolution of gas is complete. The catalyst is removed and the filtrate is extracted with four 200 ml. portions of chloroform. The chloroform solution is concentrated to a residual oil (42 g.). Thin layer chromatography on silica gel in chloroform-ethyl acetate (19:1) shows zones (developed with iodine vapor) and $R_f$ 0.7 (byproduct), 0.5 (2,3,5-tri-O-benzoyl - 2 - C - methyl - α(and β)-D-ribofuranose), and 0.4 (3,5-di-O-benzoyl-2-C-methyl - α(and β)-D-ribofuranose) 0.2 and 0.1 (by-products).

The residue is chromatographed on a short column of 650 g. of silica gel (100–200 mesh) in chloroform-ethyl acetate (99:1). Fractions containing materials of $R_f$ (TLC) 0.7, 0.5 and 0.4 are combined and concentrated to an oil (32 g.). Rechromatography of the oil on 600 g. of silica in benzene-ethyl acetate (19:1) gives 15 g. of a mixture of 2,3,5-tri-O-benzoyl-2-C-methyl-α(and β)-D-ribofuranose and 3,5-di-O-benzoyl-2-C-methyl-α(and β)-D-ribofuranose.

By further chromatography of this mixture on silica gel in benzene-ethyl acetate (19:1), fractions are obtained from which 2,3,5-tri-O-benzoyl-2-C-methyl-α(and β)-D-ribofuranose is isolated. Other later fractions yield pure 3,5-di-O-benzoyl-2-C-methyl-α(and β)-D-ribofuranose.

Chromatography of the α and β anomers of 2,3,5-tri-O-benzoyl-2-C-methyl-D-ribofuranose on acid washed alumina results in a rearrangement to 1,3,5-tri-O-benzoyl-2-C-methyl-α-D-ribofuranose, $[\alpha]_D$+92° (c. 1, $CHCl_3$). The same rearrangement occurs, but only to a slight extent, during chromatography on silica gel.

When 38 g. (63 mmoles) of 2,3,5-tri-O-p-nitrobenzoyl-2-C-methyl-D-ribono-γ-lactone is substituted for the 2,3,5-tri-O-benzoyl-2-C-methyl-D-ribono-γ-lactone in the above procedure, 2,3,5-tri-O-p-nitrobenzoyl-2-C-methyl - α(and β)-D-ribofuranose is obtained.

When 18.3 g. (63 mmoles) of 2,3,5-tri-O-acetyl-2-C-methyl-D-ribono-γ-lactone is substituted for the 2,3,5-tri-O-benzoyl-2-C-methyl-D-ribono-γ-lactone in the above procedure, 2,3,5-tri-O-acetyl-2-C-methyl - α(and β)-D-ribofuranose results.

EXAMPLE 4

1,2,3,5-tetra-O-benzoyl-2-C-methyl-α(and β)-D-ribofuranose

A mixture of 15 g. (32.2 mmoles) of 2,3,5-tri-O-benzoyl-2-C-methyl-α(and β)-D-ribofuranose in 250 ml. of dry pyridine is treated with 15.2 ml. of benzoyl chloride. The mixture is heated for 5 hours at 80° C., cooled in an ice bath, treated with 10 ml. of water and stirred for 30 minutes at 25° C. to decompose unreacted benzoyl chloride. Most of the pyridine is removed at reduced pressure and the residue in 350 ml. of chloroform is extracted with three 80 ml. portions of 10% hydrochloric acid, three 80 ml. portions of saturated sodium hydrogen carbonate solution, and three 80 ml. portions of water. The chloroform solution is concentrated and the residue (18 g.) is dissolved in 55 ml. of ether and kept at 5° C. for several hours. The precipitated 1,2,3,5 - tetra-O-benzoyl-2-C-methyl-β-D-ribofuranose, 8.25 g. (23%), is removed by filtration: M.P. 156.5–157.5° C., [α]$_D$+68° (c. 1, chloroform). The combined filtrates are concentrated to a residual oil (10 g.) containing mostly 1,2,3,5-tetra-O-benzoyl-2-C-methyl-α-D-ribofuranose and a small amount of the β anomer. Pure 1,2,3,5 - tetra-O-benzoyl-2-C-methyl-α-D-ribofuranose is obtained as an oil, [α]$_D$+67° (c. 1, chloroform), by chromatography of the residual oil on silica gel in chloroform-ethyl acetate.

When 2,3,5-tri-O-benzoyl-2-C-methyl-α(and β)-D-ribofuranose is replaced by 1,3,5-tri-O-benzoyl-2-C-methyl-α(and β)-D-ribofuranose in the above procedure, the same end product is obtained.

When 11 ml. of acetic anhydride is substituted for the benzoyl chloride used in the above procedure, 1-O-acetyl-2,3,5 - tri-O-benzoyl-2-C-methyl-α(and β)-D-ribofuranose is obtained.

When 9.3 g. (32 mmoles) of 2,3,5-tri-O-acetyl-2-C-methyl-α(and β)-D-ribofuranose is substituted for the 2,3,5-tri-O-benzoyl-2-C-methyl-α(and β)-D-ribofuranose in the above procedure, 2,3,5-tri-O-acetyl-1-O-benzoyl-2-C-methyl-α(and β)-D-ribofuranose results.

EXAMPLE 5

1,2 - di - O-p-nitrobenzoyl-3,5-di-O-benzoyl-2-C-methyl-α(and β)-D-ribofuranose

A solution of 290 mg. (0.78 mmoles) of 3,5-di-O-benzoyl-2-C-methyl-α(and β)-D-ribofuranose in 10 ml. of dry pyridine is treated with 445 mg. (2.4 mmoles) of p-nitrobenzoyl chloride. After being heated at 45° C. for 3 hours the mixture is poured into 20 ml. of saturated sodium hydrogen carbonate solution and ice. The gum which precipitates is extracted into two 25-ml. portions of chloroform and the chloroform solution is washed with two 25 ml. portions of 10% hydrochloric acid, two 25 ml. portions of saturated sodium hydrogen carbonate, and two 25 ml. portions of water. The chloroform layer is concentrated to a residual oil which crystallizes on the addition of ether. The solid is recrystallized from benzene-petroleum ether to yield 102 mg. (20%) of 1,2-di-O-p-nitrobenzoyl - 3,5-di-O-benzoyl-2-C-methyl-β-D-ribofuranose, M.P. 207–208° C.

EXAMPLE 6

Methyl 2,3,5-tri-O-benzoyl-2-C-methyl-α(and β)-D-ribofuranoside

A solution of 4.66 g. (10 mmoles) of 2,3,5-tri-O-benzoyl-2-C-methyl-α(and β)-D-ribofuranose in 100 ml. of dry methanol is treated with 10 ml. of a 20% (w./w.) solution of hydrogen chloride in dry methanol. After being kept at 25° C. for 4 hours the solution is neutralized with excess solid sodium hydrogen carbonate and filtered. The filtrate is concentrated to a residual oil and the methyl 2,3,5-tri-O-benzoyl-2-C-methyl-α(and β)-D-ribofuranoside is purified by chromatography on silica gel in chloroform.

When 2.9 g. (10 mmoles) of 2,3,5-tri-O-acetyl-2-C-methyl-α(and β)-D-ribofuranose is substituted for the 2,3,5-tri-O-benzoyl-2-C-methyl-α(and B)-D-ribofuranose used in the above procedure methyl 2,3,5-tri-O-acetyl-2-C-methyl-α(and β)-D-ribofuranoside is obtained.

When 6.0 g. (10 mmoles) of 2,3,5-tri-O-p-nitrobenzoyl-2-C-methyl-α(and β)-D-ribofuranose is substituted for the 2,3,5 - tri-O-benzoyl-2-C-methyl-α(and β)-D-ribofuranose results.

When ethanol is substituted for methanol whenever it is used in the above procedures the corresponding ethyl 2,3,5-tri-O-benzoyl-2-C-methyl-α(and β)-D-ribofuranoside results.

EXAMPLE 7

2,3,5-tri-O-benzoyl-2-C-methyl-D-ribofuranosyl chloride: from 1,2,3,5-tetra-O-benzoyl-2-C-methyl-β-D-ribofuranose To 300 ml. of dry ether saturated at 0° C. with hydrogen chloride in a round bottom flask is added 12 ml. of acetyl chloride and 6 g. (10 mmoles) of 1,2,3,5-tetra-O-benzoyl-2-C-methyl-β-D-ribofuranose. The flask is tightly stoppered and kept at 25° C. for 2.5 hours. The compound dissolves during the first hour. The solvent is removed at reduced pressure and 75 ml. of dry toluene is similarly distilled from the residue. The residue is dissolved in 300 ml. of dry ether and rapidly extracted with three 120 ml. portions of cold, saturated sodium hydrogen carbonate and two 120 ml. portions of cold water. The ether layer is dried and concentrated at reduced presure. The 2,3,5-tri-O-benzoyl-2-C-methyl-D-ribofuranosyl chloride (5.0 g.), is obtained as an oil: thin layer chromatography on alumina in benzene-chloroform (1:1), R$_f$ 0.3;

$$\tau_{60\ \text{Mc}}^{\text{CDCl}_3}$$

3.13 (singlet, C–1 proton), 3.92 (doublet, C–3 proton, J$_{3,4}$ 7.5 cps.), 5.27 (multiplet, C–4 and C–5 protons), 8.02 p.p.m. (singlet, C–2 methyl protons).

EXAMPLE 8

2,3,5-tri-O-benzoyl-2-C-methyl-D-ribofuranosyl chloride: from 1,2,3,5-tetra-O-benzoyl-2-C-methyl-α-D-ribofuranose A solution of 5.9 g. (10 mmoles) of 1,2,3-5-tetra-O-benzoyl-2-C-methyl-α-D-ribofuranose in 105 ml. of acetic acid containing 5 ml. of acetyl chloride is added to a round bottom flask containing 260 ml. of ether and 4 ml. of acetyl chloride saturated with hydrogen chloride at 0° C. The flask is tightly stoppered and kept at 25° C. for 48 hours. The solvents are removed at reduced pressure. The residue is dissolved in 150 ml. of ether and is extracted with three 75 ml. portions of cold, saturated sodium hydrogen carbonate and three 75 ml. portions of cold water. The ether layer is dried over anhydrous magnesium sulfate. The mixture is filtered and the filtrate is concentrated at reduced pressure. The residue (5.8 g.) which consists of a mixture of 2,3,5-tri-O-benzoyl-2-C-methyl-D-ribofuranosyl chloride and 1-O-acetyl-2,3,5-tri-O-benzoyl-2-C-methyl-α(and β)-D-ribofuranose is dissolved in 250 ml. of ether containing 0.5 ml. of acetyl chloride and saturated with hydrogen chloride. After being kept at 25° C. for 2.5 hours, the solution is concentrated at reduced pressure. Three 50 ml. portions of dry toluene are distilled from the residue at reduced pressure. The residual 2,3,5-tri-O-benzoyl-2-C-methyl-D-ribofuranosyl chloride has the same physical properties as the product obtained in Example 7.

When 6.1 g. (10 mmoles) of 1-O-acetyl-2,3,5-tri-O-p-nitrobenzoyl-2-C-methyl-α(and β)-D-ribofuranose is substituted for the 1,2,3,5-tetra-O-benzoyl-2-C-methyl-α-D-ribofuranose in the above procedure, 2,3,5-tri-O-p-nitrobenzoyl-2-C-methyl-D-ribofuranosyl chloride is obtained.

When an equivalent amount of methyl 2,3,5-tri-O-benzoyl-2-C-methyl-α(and β)-D-ribofuranoside (as prepared in Example 6), or methyl 2,3,5-tri-O-benzoyl-2-C-ethyl-α-D-ribofuranoside (as prepared in Example 15) is substituted for the 1,2,3,5-tetra-O-benzoyl-2-C-methyl-α-D-ribofuranose in the above procedure, the corresponding 2,3,5-tri-O-benzoyl-2-C-methyl(or 2-C-ethyl)-D-ribofuranosyl chloride is obtained.

EXAMPLE 9

2,3,5-tri-O-acetyl-2-C-methyl-D-ribofuranosyl bromide

A solution of 3.9 g. (10 mmoles) of 2,3,5-tri-O-acetyl-1-O-benzoyl-2-C-methyl-α(and β)-D-ribofuranose in 105 ml. of acetic acid containing 5 ml. of acetyl bromide is added to 260 ml. of ether and 4 ml. of acetyl bromide saturated with hydrogen bromide at 0° C. in a round bottom flask. The flask is tightly stoppered and kept at 25° C. for 48 hours. The solvents are removed at reduced pressure. The residue is dissolved in 150 ml. of ether, which is extracted with three 75 ml. portions of cold, saturated sodium hydrogen carbonate and three 75 ml. portions of cold water. The ether solution is dried over anhydrous magnesium sulfate. The mixture is filtered and the filtrate is concentrated at reduced pressure. The residue is dissolved in a mixture of 250 ml. of ether and 0.5 ml. of acetyl bromide saturated with hydrogen bromide at 0° C. After being kept at 25° C. for 2.5 hours, the solution is concentrated at reduced pressure. Three 50 ml. portions of dry toluene are distilled from the residue at reduced pressure. A residue of 2,3,5-tri-O-acetyl-2-C-methyl-D-ribofuranosyl bromide is obtained.

EXAMPLE 10

2,3,5-tri-O-benzoyl-2-C-methyl-D-ribofuranosyl bromide

A solution of 1.5 g. (2.6 mmoles) of 1,2,3,5-tetra-O-benzoyl-2-C-methyl-α-D-ribofuranose in 7.5 ml. of acetic acid is treated with 0.25 ml. of acetyl bromide and 7.5 ml. of a 32% (w./w.) solution of hydrogen bromide in acetic acid. The mixture is kept at 25° C. for 24 hours. The mixture is concentrated and a portion of dry toluene is distilled at reduced pressure from the residue to remove excess hydrogen bromide and acetic acid. The residue is dissolved in dry ether and quickly washed with cold saturated sodium bicarbonate and finally with cold water. After being dried, the ether solution is concentrated and a residue of 2,3,5-tri-O-benzoyl-2-C-methyl-β-D-ribofuranosyl bromide is obtained.

When an equivalent amount of methyl 2,3,5-tri-O-benzoyl-2-C-methyl-α(and β)-D-ribofuranoside (as prepared in Example 6), or methyl 2,3,5-tri-O-benzoyl-2-C-ethyl-α-D-ribofuranoside (as prepared in Example 15) is substituted for the 1,2,3,5-tetra-O-benzoyl-2-C-methyl-α-D-ribofuranose in the above procedure, the corresponding 2,3,5-tri-O-benzoyl-2-C-methyl(or 2-C-ethyl)-β-D-ribofuranosyl bromide is obtained.

EXAMPLE 11

1,3,5-tri-O-benzoyl-α-D-ribofuranose

A solution of 2,3,5-tri-O-benzoyl-D-ribofuranosyl chloride (prepared from 9.2 g. of 1-O-acetyl-2,3,5-tri-O-benzoyl-β-D-ribofuranoside) in 36 ml. of acetone and 1.7 ml. of water is kept at 25° C. for 1 hour. The solution is diluted with 100 ml. of methylene chloride and washed with 25 ml. of cold 10 percent sodium hydrogen carbonate solution. The organic phase is dried over anhydrous $MgSO_4$, and concentrated to a residual oil at reduced pressure. Addition of ether to the oil causes crystalization and 3.0 g. of 1,3,5-tri-O-benzoyl-α-D-ribofuranose, M.P. 140–143° C.

EXAMPLE 12

Methyl 3,5-di-O-benzoyl-α(and β)-D-ribofuranoside

A solution of 5 g. of 1,3,5-tri-O-benzoyl-α-D-ribofuranose in 1000 ml. of one percent methanolic hydrogen chloride is kept at 25° C. for 4 hours. The hydrogen chloride is neutralized with solid sodium hydrogen carbonate and the mixture is filtered. The filtrate is concentrated to dryness at reduced pressure, and the residue is leached with two 250-ml. portions of methylene chloride. The methylene chloride extracts are combined and concentrated at reduced pressure. The residual oil is chromatographed on silica gel in benzene-ethyl acetate (4:1). After elution of some unreacted starting material, several fractions containing methyl 3,5-di-O-benzoyl-β-D-ribofuranoside are obtained. The product is isolated as a crystalline solid by concentration of the solution to dryness.

Concentration of later column fractions give a residual oil containing mostly methyl 3,5-di-O-benzoyl-α-D-ribofuranoside.

EXAMPLE 13

Methyl 3,5-di-O-benzoyl-α-D-erythro-pentofuran-2-uloside

A solution of 12.5 g. of sodium metaperiodate in 150 ml. of water is cooled in an ice bath and added portionwise to a vigorously stirred suspension of 1.5 g. of ruthenium dioxide in 150 ml. of carbon tetrachloride cooled in an ice bath. About 20 to 30 minutes after the addition is complete, most of the black, insoluble ruthenium dioxide has been converted to a solution of yellow ruthenium tetroxide. The carbon tetrachloride is separated from the water layer and added over 15 minutes to a stirred solution of 2.2 g. (6 mmoles) of methyl 3,5-di-O-benzoyl-α-D-ribofuranoside in 150 ml. of carbon tetrachloride. After one hour, the reaction mixture, which now contains a black precipitate of ruthenium dioxide, is warmed to room temperature and stirred for an additional 2 hours. The course of the reaction may be followed by thin layer chromatography on silica gel in benzene-ethyl acetate (4:1).

The reaction mixture is treated with 1 ml. of isopropanol in 5 ml. of carbon tetrachloride to decompose unreacted ruthenium tetroxide. The black ruthenium dioxide is removed and washed with water; the combined filtrates are washed with 10 ml. of saturated sodium hydrogen carbonate solution. The carbon tetrachloride layer is concentrated at reduced pressure, and a residue containing methyl 3,5-di-O-benzoyl-α-D-erythro-pentofuran-2-uloside is obtained. The product is purified by a combination of chromatography on silica gel followed by crystallization from ether-petroleum ether.

EXAMPLE 14

Methyl 3,5-di-O-benzoyl-2-C-ethyl-α-D-ribofuranoside

A solution of ethyl magnesium iodide is prepared by adding 3.2 g. (21 mmoles) of ethyl iodide in 50 ml. of dry ether to a stirred suspension of 0.64 g. (26.4 mmoles) of magnesium shavings in 10 ml. of dry ether. The Grignard solution is added to a stirred solution of 0.98 g. (2.64 mmoles) of methyl 3,5-di-O-benzoyl-α-D-erythro-pentofuran-2 uloside in 60 ml. of dry ether at 5° C. A heavy, white precipitate forms immediately. The reaction mixture is poured into a cold, stirred mixture of 80 ml. of ether and 10 g. of ammonium chloride dissolved in 120 ml. of water. The water layer is separated and extracted with three 40-ml. portions of ether. The ether layers are combined, washed with 20 ml. of saturated sodium chloride solution, and dried over anhydrous magnesium sulfate. Concentration of the ether solution at reduced pressure gives a residue containing methyl 3,5-di-O-benzoyl-2-C-ethyl-α-D-ribofuranoside. The product is purified by chromatography on silica gel in benzene-ethyl acetate (4:1).

EXAMPLE 15

Methyl 2,3,5-tri-O-benzoyl-2-C-ethyl-α-D-ribofuranoside

To 6.1 g. (15.3 mmoles) of methyl 3,5-di-O-benzoyl-2-C-ethyl-α-D-ribofuranoside in 50 ml. of dry (BaO) pyridine is added 4.4 g. (30.6 mmoles) of benzoyl chloride, and the mixture is heated at 90±5° C. for 16 hours. The mixture is cooled to 25° C., stirred with 5 ml. of water for 30 minutes, and added to 250 ml. 10% hydrochloric acid and 300 ml. of chloroform. The water layer is extracted with two 250-ml. portions of chloroform, and the combined chloroform layers are washed with two 200-ml. portions of saturated sodium hydrogen carbonate solution and 300 ml. of saturated sodium chloride solution. After being dried over anhydrous magnesium sulfate, the chloroform solution is concentrated at reduced pressure and the residual oil is chromatographed on silica gel in chlorofrom. Purified methyl 2,3,5-tri-O-benzoyl-2-C-ethyl-α-D-ribofuranoside is obtained after removal of the solvent from early column fractions.

EXAMPLE 16

2-C-methyl-D-ribofuranose

A solution of 2.05 g. (4.0 mmoles) of methyl 2,3,5-tri-O-benzoyl-2-C-methyl-D-ribofuranoside, as prepared in Example 6, in 50 ml. of methanol is treated with 5 ml. of 0.5 N barium hydroxide in methanol. After being refluxed for 30 minutes, the solution is concentrated to about 10 ml. and diluted with 50 ml. of water. After adding 5 ml. of 0.5 N sulfuric acid, the precipitated barium sulfate is filtered. The filtrate is acidified to pH 2 with hydrochloric acid and concentrated to dryness. The residue contains 2-C-methyl-D-ribofuranose.

In accordance with the above procedure but starting with methyl 2,3,5-tri-O-benzoyl-2-C-ethyl-D-ribofuranoside, as prepared in Example 15, the product obtained is 2-C-ethyl-D-ribofuranose.

EXAMPLE 17

1,2-O-isopropylidene-5-O-benzoyl-3-methyl-D-ribofuranose

A Grignard reagent, methyl magnesium iodide, prepared from 690 mg. (28.4 mmoles) of magnesium and 3.85 g. (27.5 mmoles) of methyl iodide in 32 ml. of dry ether is added to a stirred solution of 1.0 g. (3.43 mmoles) of 1,2-O-isopropylidene-5-O-benzoly-α-D-erythro—pentofuran-3-ulose in 100 ml. of dry ether at 5° C. After about 3 hours the reaction mixture is poured into a mixture of 50 g. of ammonium chloride, 200 ml. of ice and water, and 200 ml. of ether. The layers are separated and the aqueous phase is extracted with two 150-ml. portions of ether. The ether solution, dried over $MgSO_4$, is concentrated to dryness and the residue (1.24 g.) is crystalized from ether. A total of 524 mg. of 1,2-O-isopropylidene - 5 - O - benzoyl - 3 - C - methyl - α - D-ribofuranose is obtained.

When a Grignard reagent prepared from ethyl bromide is reacted with 1,2-O-isopropylidene-5-O-benzoyl-α-D-erythro - pentofuran - 3 - ulose as described in the above procedure 1,2-O-isopropylidene-5-O-benzoyl-3-C-ethyl-α-D-ribofuranose is obtained.

EXAMPLE 18

Methyl 5-O-benzoyl-3-C-methyl-D-ribofuranoside

A solution of 1.0 g. (3.25 mmoles) of 1,2-O-iso-propylidene-5-O-benzoyl-3-C-methyl-α-D-ribofuranose in 25 ml. of 3% methanolic hydrogen chloride is kept at 25° C. for 75 minutes. The hydrogen chloride is neutralized by the portionwise addition of 2.5 g. (30 mmoles) of sodium bicarbonate. The mixture is filtered and the solid is washed with methanol. The filtrate plus washings are concentrated, and the residue is leached with three 50-ml. portions of methylene chloride. The methylene chloride solution is treated with a small amount of decolorizing carbon, filtered and concentrated. The residue is chromatographed on 20 g. of silica gel. Elution with ethyl acetate-chloroform (1:9) gives 290 mg. of crude methyl 5 - O - benzoyl - 2,3 - O - isopropylidene - 3-C - methyl-β-D-ribofuranoside. Further elution with ethyl acetate-chloroform (1:9) gives about 240 mg, of mixed products. Finally, elution with ethyl acetate-chloroform (1:1) gives 420 mg. (46%) of methyl 5-O-benzoyl-3-C-methyl-D-ribofuranoside as an oil.

When the above procedures are carried out starting with 5 - O - benzoyl - 1,2 - O - isopropylidene - 3 - C-ethyl - α - D - ribofuranose, the methyl 5 - O - benzoyl-3-C-ethyl-D-ribofuranoside is obtained.

EXAMPLE 19

Ethyl 5-O-benzoyl-3-C-methyl-D-ribofuranoside

A solution of 1.0 g. (3.25 mmoles) of 1,2-O-isopropylidene-5-O-benzoyl-3-C-methyl-α-D-ribofuranose in 25 ml. of ethanolic hydrogen chloride is kept at 25° C. for 75 minutes. The hydrogen chloride is neutralized with solid sodium bicarbonate. The mixture is filtered, the filtrate is concentrated, and the residue is leached with methylene chloride. The methylene chloride solution is concentrated and the residual oil is chromatographed on silica gel. Elution with ethyl acetate-chloroform gives ethyl 5-O-benzoyl-3-C-methyl-D-ribofuranose as an oil.

EXAMPLE 20

Methyl 2,3,5-tri-O-benzoyl-3-C-methyl-D-ribofuranoside

The 420 mg. (1.49 mmoles) of methyl 5-O-benzoyl-3-C-methyl-D-ribofuranoside from Example 18 is dissolved in 7.5 ml. of dry pyridine and cooled in an ice bath. A solution of 463 mg. (3.3 mmoles) of benzoyl chloride in 2.5 ml. of dry chloroform is added dropwise with stirring. The reaction mixture is kept at 25° C. for 24 hours and 0.5 ml. of water is added. After 30 minutes the mixture is poured onto 30 ml. of ice and water and extracted with three 30-ml. portions of chloroform. The chloroform solution is washed with cold 5% hydrochloric acid until the washings are acidic, and finally with saturated sodium chloride solution. The dried ($MgSO_4$) chloroform solution is concentrated to dryness and a residue of methyl 2,5-di-O-benzoyl-3-C-methyl-D-ribofuranoside is obtained.

A solution of 230 mg. (0.595 mmole) of methyl 2,5-di-O-benzoyl-3-C-methyl-D-ribofuranoside in 3 ml. of dry pyridine is treated with a solution of 90 mg. (0.64 mmole) of benzoyl chloride in 1 ml. of dry chloroform. The mixture is heated at 100° C. for 16 hours, cooled to 25° C., treated with 0.5 ml. of water and warmed to 40° C. The cooled mixture is added to a mixture of ice and water, and extracted with three 50-ml. portions of chloroform. The chloroform is washed with 10% hydrochloric acid until the washings are acidic, and then with 10% sodium bicarbonate. The dried ($MgSO_4$) chloroform layer is concentrated, and the residue (370 mg.) is chromatographed on 8 g. of silica gel. Methyl 2,3,5-tri-O-benzoyl-3-C-methyl-D-ribofuranoside (280 mg.; 95%) is obtained.

When the above procedures are carried out starting with methyl 5-O-benzoyl-3-C-ethyl-D-ribofuranoside from Example 18 there is obtained methyl 2,5-di-O-benzoyl-3-C-ethyl-D-ribofuranoside and methyl 2,3,5-tri-O-benzoyl-3-C-ethyl-D-ribofuranoside.

EXAMPLE 21

Ethyl 2,3-di-O-acetyl-5-O-benzoyl-3-C-methyl-D-ribofuranoside

A solution of 1.0 g. (3.4 mmoles) of ethyl 5-O-benzoyl-3-C-methyl-D-ribofuranoside, as prepared in Example 19, in 20 ml. of dry pyridine is cooled and treated with 1.0 g. (10 mmoles) of acetic anhydride. After being kept 1 hour at 25° C. the mixture is heated at 100° C. for 20 hours, cooled to 25° C., and treated with 1 ml. of water. The mixture is added to ice and water and the product is extracted with three 100-ml. portions of chloroform. The chloroform solution is washed with 10% hydrochloric acid to remove excess pyridine and finally with dilute sodium bicarbonate solution until neutral. The chloroform solution, dried over $MgSO_4$, is concentrated and a residue of ethyl 2,3-di-O-acetyl-5-O-benzoyl-3-C-methyl - D - ribofuranoside is obtained.

EXAMPLE 22

2,3,5-tri-O-benzoyl-3-C-methyl-D-ribofuranosyl bromide

A solution of 2 g. (4.04 mmoles) of methyl 2,3,5-tri-O-benzoyl-3-C-methyl-D-ribofuranoside, as prepared in Example 20, in 10 ml. of acetic acid is cooled in an ice bath and 1 ml. of acetyl bromide is added, followed by 10 ml. of a 33% solution of hydrogen bromide in acetic acid. After 15 minutes at 0°–5° C., the solution is kept at 25° C. for 35 minutes. Concentration of the solution gives a residual oil which is freed of last traces of hydrogen bromide by distilling with 3 portions of dry toluene. 2,3,5-tri-O-benzoyl-3-C-methyl - D - ribofuranosyl bromide results.

EXAMPLE 23

2,3-di-O-acetyl-5-O-benzoyl-3-C-methyl-D-ribofuranosyl bromide

A solution of 1.52 g. (4.0 mmoles) of ethyl 2,3-di-O-acetyl-5-O-benzoyl-3-C-methyl - D - ribofuranoside prepared in Example 21, in 10 ml. of acetic acid is cooled in an ice bath. One ml. acetyl bromide is then added, followed by 10 ml. of a 33% solution of hydrogen bromide in acetic acid. After being kept at 25° C. for 50 minutes, the solution is concentrated to a residue of 2,3-di-O-acetyl-5-O-benzoyl-3-C-methyl - D - ribofuranosyl bromide. Last traces of hydrogen bromide and acetic acid are removed by distilling 3 portions of dry toluene from the product.

EXAMPLE 24

2,3,5-tri-O-benzoyl-3-C-methyl-D-ribofuranosyl chloride

A solution of 2 g. (4.0 mmoles) of methyl 2,3,5-tri-O-benzoyl-3-C-methyl-D-ribofuranoside, as prepared in Example 20, in 10 ml. of acetic acid is cooled in an ice bath. One ml. of acetyl chloride is added followed by 10 ml. of a 20% (w./w.) solution of hydrogen chloride in acetic acid After 48 hours at 25° C the solution is concentrated Three portions of dry toluene are distilled from the residue to remove last traces of acetic acid and hydrogen chloride. A residue of 2,3,5-tri-O-benzoyl-3-C-methyl-D-ribofuranosyl chloride is obtained.

EXAMPLE 25

3-C-methyl-D-ribofuranose

A solution of 2.0 g. (4.0 mmoles) of methyl 2,3,5-tri-O-benzoyl-3-C-methyl-D-ribofuranoside, as prepared in Example 20, in 50 hl. of methanol is treated with 5 ml. of 0.5 N barium methoxide in methanol. After being refluxed for 30 minutes, the solution is concentrated to about 10 ml. and diluted with 50 ml. of water. After adding 5 ml. of 0.5 N sulfuric acid, the precipitated barium sulfate is filtered. The filtrate is acidified to pH 2 with hydrochloric acid and kept at 60° C. for several hours. Concentration of the aqueous solution gives a residue containing 3-C-methyl-D-ribofuranose.

EXAMPLE 26

1,2-O-isopropylidene-3,5-di-O - benzoyl-3-C-methyl-α-D-ribofuranose

A solution of 1.0 g. (3.54 mmoles) of 1,2- isopropylidene-5-O-benzoyl-3-C - methyl-α-D-ribofuranose, as prepared in Example 17, in 12 ml. of dry pyridine is cooled, stirred and treated with a solution of 750 mg. (5.3 mmoles) of benzoyl chloride in 2 ml. of dry chloroform. The mixture is kept at 25° C. for 72 hours, 0.5 ml. of water is added, and the mixture is stirred for 1 hour and poured into 75 ml. of ice and water. About 25 ml. of 10% hydrochloric acid is added and the mixture is extracted with chloroform which is, in turn, washed with 10% sodium bicarbonate and saturated sodium cholride. The dried chloroform layer is concentrated. The residue when crystallized from 1 ml. of benzene and 25 ml. of petroleum ether gives 700 mg. of 1,2-O-isopropylidene-3,5-di-O-benzoyl-3 - C-methyl-α-D-ribofuranose.

EXAMPLE 27

1,2-di-O-acetyl-3,5-di-O-benzoyl-3-C-methyl-D-ribofuranose

To a mixture of 130 ml. of acetic acid and 14.4 ml. of acetic anhydride is added 21.5 g. (28 mmoles) of 3,5-di-O-benzoyl-1,2-O - isopropylidene-3-C-methyl-α-D-ribofuranose, as prepared in Example 26. During a 45 minute period 7.8 ml. of concentrated sulfuric acid is added dropwise to the stirred mixture. An ice bath is used to maintain the temperature of the reaction mixture at 15–20° C. during the addition of the sulfuric acid. After being kept at room temperature 16 hours, the solution is poured into 630 ml. of ice water. The product is extracted with two 120-ml. portions of chloroform which is in turn washed with three 75-ml. portions of 1 N sodium bicarbonate. Concentration of the dried (MgSO$_4$) chloroform solution gives a residue of 1,2-di-O-acetyl-3,5-di-O-benzoyl-3-C-methyl-D-ribofuranose.

EXAMPLE 28

1,2-di-O-propionyl-3,5-di-O-benzoyl-3-C-methyl-D-ribofuranose

To a mixture of 150 ml. of propionic acid and 17 ml. of propionic anhydride is added 11.5 g. (28 mmoles) of 3,5-di-O-benzoyl-1,2-O -isopropylidene-3-C-methyl-α-D-ribofuranose, as prepared in Example 26. During a 45-minute period 7.8 ml. of concentrated sulfuric acid is added dropwise to the stirred mixture. An ice bath is used to maintain the temperature of the reaction mixture at 15–20° C. during the addition of the sulfuric acid. After being kept at room temperature 16 hours, the solution is poured into 630 ml. of ice water. The product is extracted with two 120-ml. portions of chloroform which is, in turn, washed with three 75-ml. portions of 1 N sodium bicarbonate. Concentration of the dried (MgSO$_4$) chloroform solution gives a residue of 1,2-di-O-propionyl-3,5-di-O-benzoyl-3-C-methyl-D-ribofuranose.

EXAMPLE 29

1,2-di-O-butyryl-3,5-di-O-benzoyl-3-C-methyl-D-ribofuranose

To a mixture of 160 ml. of butyric acid and 196 ml. of butyric anhydride is added 11.5 g. (28 mmoles) of 3,5-di-O-benzoyl-1,2-O-isopropylidene-3 - C-methyl-α-D-ribofuranose, as prepared in Example 26. During a 45-minute period 7.8 ml. of concentrated sulfuric acid is added dropwise to the stirred mixture. An ice bath is used to maintain the temperature of the reaction mixture at 15–20° C. during the addition of the sulfuric acid. After being kept at room temperature 16 hours, the solution is poured into 630 ml. of ice water. The product is extracted with two 120-ml. portions of chloroform which is, in turn, washed with three 75-ml. portions of 1 N sodium bicarbonate. Concentration of the dried (MgSO$_4$) chloroform solution gives a residue of 1,2-di-O-butyryl-3,5-di-O-benzoyl-3-C-methyl-D-ribofuranose.

EXAMPLE 30

1,2-O-isopropylidene-3,5-di-O-benzoyl-3-C-ethyl-D-ribofuranose

A Grignard reagent prepared from 690 mg. (28 mmoles) of magnesium and 3.97 g. (27.5 mmoles) of ethyl bromide in 45 ml. of dry ether is added to a stirred solution of 1.0 g. (3.42 mmoles) of 1,2-O-isopropylidene-5-O-benzoyl-α-D-erythro-pentofuran-3-ulose in 100 ml. of dry ether at 5° C. After 3 hours the reaction product is poured into a mixture of 50 g. of ammonium chloride, 200 ml. of ice and water, and 200 ml. of ether. The layers are separated and the aqueous phase is extracted with two 150-ml. portions of ether. The dried (MgSO$_4$) ether solution is concentrated to a residue of 1,2-O-isopropylidene-5-O-benzoyl-3-C-ethyl-α-D-ribofuranose.

A solution of 1.05 g. (3.54 mmoles) of 1,2-O-isopropylidene-5-O-benzoyl-3-C-ethyl-α - D-ribofuranose in 12 ml. of dry pyridine is treated with 750 mg. (5.3 mmoles) of benzoyl chloride in 2 ml. of dry chloroform. After being kept at 25° C. for 72 hours, 0.5 ml. of water is added and the mixture is stirred for 1 hour and poured into 75 ml. of ice and water. About 25 ml. of 10% hydrochloric acid is added and the mixture is extracted with chloroform which is, in turn, washed with 10% sodium bicarbonate. The dried chloroform layer is concentrated, and the 1,2-O-isopropylidene-3-5-di-O-benzoyl-3-C-ethyl-α-D-ribofuranose is crystallized from benzene-petroleum ether.

EXAMPLE 31

1,2-di-O-acetyl-3,5-di-O-benzoyl-3-C-ethyl-D-ribofuranose

To a mixture of 130 ml. of acetic acid and 14.4 ml. of acetic anhydride is added 11.8 g. (28 mmoles) of 1,2-O-isopropylidene-3,5-di- O - benzoyl-3-C-ethyl-α-D- ribofuranose, as prepared in Example 30. During a 45-minute period 7.8 ml. of concentrated sulfuric acid is added dropwise to the stirred mixture. An ice bath is used to maintain the temperature of the reaction mixture at 15–20° C. during the addition of the sulfuric acid. After being kept at room temperature for 16 hours, the solution is poured into 630 ml. of ice water. The product is extracted with two 120-ml. portions of chloroform which is, in turn, washed with three 75-ml. portions of 1 N sodium bicarbonate. Concentration of the dried (MgSO₄) chloroform solution gives a residue of 1,2-di-O-acetyl-3,5-di-O-benzoyl-3-C-ethyl-D-ribofuranose.

EXAMPLE 32

2,3,5-O-benzoyl-3-C-ethyl-D-ribofuranosyl bromide

A solution of 2.0 g. (4.0 mmoles) of methyl 2,3,5-tri-O-benzoyl-3-C-ethyl-D-ribofuranoside, as prepared in Example 20, in 10 ml. of acetic acid is cooled in an ice bath and 1 ml. of acetyl bromide is added followed by 10 ml. of a 33% solution of hydrogen bromide in acetic acid. After 15 minutes at 0—5° C. the solution is kept at 25° C. for 35 minutes. Concentration of the solution gives a residual oil which is freed of last traces of hydrogen bromide and acetic acid by distilling 3 portions of toluene and 2,3,5-tri-O-benzoyl-3-C-ethyl-D-ribofuranosyl bromide is obtained.

EXAMPLE 33

3-C-ethyl-D-ribofuranose

A solution of 2.05 g. (4.0 mmoles) of methyl 2,3,5-tri-O-benzoyl-3-C-ethyl-D-ribofuranoside, as prepared in Example 20, in 50 ml. of methanol is treated with 5 ml. of 0.5 N barium methoxide in methanol. After being refluxed for 30 minutes, the solution is concentrated to about 10 ml. and diluted with 50 ml. of water. After adding 5 ml. of 0.5 N sulfuric acid, the precipitated barium sulfate is filtered. The filtrate is acidified to pH 2 with hydrochloric acid and kept at 60° C. for several hours. Concentration of the aqueous solution gives residue containing 3-C-ethyl-D-ribofuranose.

EXAMPLE 34

2'-C-methyladenosine

A suspension of 2.82 g. (5.95 mmoles) of finely ground chloromercuri 6-benzamidopurine in 200 ml. of xylene is dried by distilling 100 ml. of xylene. The mixture is cooled and a solution of 2,3,5-tri-O-benzoyl-2-C-methyl-D-ribofuranosyl chloride [made from 3.45 g. (5.95 mmoles) of 1,2,3,5-tetra-O-benzoyl-2-C-methyl-D-ribofuranose] in 30 ml. of dry xylene is added. The mixture is stirred and refluxed for 80 minutes. The hot mixture is filtered and the solid is washed with 25 ml. of hot xylene. The filtrate and washings are diluted with 400 ml. of petroleum ether, and after being kept at 5° C. for 20 hours, the mixture is filtered. The solid is dissolved in 300 ml. of chloroform and the solution is washed with two 20 ml. portions of 30% potassium iodide solution and two 20 ml. portions of water. Concentration of the dried chloroform layer gives amorphous product which is chromatographed on 70 g. of alumina in ethyl acetate-chloroform (1:4). Fractions showing only one zone (R_f 0.65) after thin layer chromatography on alumina in ethyl acetate-chloroform (1:4) are combined and concentration of the solvent gives 9-(2,3,5-tri-O-benzoyl-2-C-methyl-β-D-ribofuranosyl)-6-benzamidopurine as an amorphous solid.

A mixture of 1.48 g. (2.08 mmoles) of 9-(2,3,5-tri-O-benzoyl - 2 - C - methyl - β - D - ribofuranosyl) - 6 - benzamidopurine and 15 ml. of dry methanol is treated with a solution of sodium methoxide prepared from 70 mg. (3 mmoles) of sodium and 5 ml. of methanol. After the mixture is refluxed for 45 minutes, it is concentrated and the residue is dissolved in 50 ml. of water. The pH is adjusted to 6.8 with a few drops of acetic acid. The solution is extracted with three 20 ml. portions of ether and the water layer is filtered and concentrated to about 5 ml. The solid obtained is recrystallized from 7 ml. of warm water, giving 360 mg. (59%) of crystalline 2'-C-methyladenosine (II), M.P. 257–258° C.;

$\lambda_{max}^{H_2O}$ m$\mu$ ($\epsilon \times 10^{-3}$): 258 at pH 1 (15.1), 260 at pH (15.1), 260 at pH 13 (14.9); $\gamma$ deuteriopyridine 3.10 (singlet, H–1') and 4.93 p.p.m. (doublet, H–3' (J$_{3',4'}$=8.8 cps.); [$\alpha$]$_D$ —21° (c. 0.5, H$_2$O); [$\phi$]—2500° at $\lambda_{278}$, [$\phi$]+ 10,000° at $\lambda_{247}$ (c. 5.16×10$^{-3}$, H$_2$O)[7].

In accordance with the above procedures, but reacting the chloromercuri-6-benzamidopurine with 2,3,5-tri O-acetyl-2-C-methyl-D-ribofuranosyl bromide, instead of 2,3,5-tri-O-benzoyl-2-C-methyl-D-ribofuranosyl chloride in the first step, 2'-C-methyladenosine is likewise obtained.

Similarly 2'-C-ethyladenosine is obtained when equivalent amounts of 2,3,5-tri-O-benzoyl-2-C-ethyl-D-ribofuranosyl chloride is used in place of the 2,3,5-tri-O-benzoyl-2-C-methyl-D-ribofuranosyl chloride as the starting material in the above procedures. Likewise the corresponding material in the above procedures. Likewise the corresponding 2'-C-ethyladosine is obtained when an equivalent amount of 2,3,5-tri-O-acetyl-2-C-ethyl-D-ribofuranosyl chloride is used in place of the 2,3,5-tri-O-benzoyl-2-C-methyl-D-ribofuranosyl chloride in the above procedures.

EXAMPLE 35

3'-C-methyladenosine

A suspension of 1.92 g. (4.04 mmoles) of finely ground chloromercuri 6-benzamidopurine in 170 ml. of xylene is dried by distilling 90 ml. of xylene. The mixture is cooled and a solution of 2,3,5-tri-O-benzoyl-3-C-methyl-D-ribofuranosyl bromide [made from 2.0 g. (4.04 mmoles) of methyl 2,3,5-tri-O-benzoyl-3-C-methyl-D-ribofuranoside] in 20 ml. of dry xylene is added. The mixture is stirred and refluxed for 40 minutes. The hot mixture is filtered and the solid is washed with 25 ml. of hot xylene. The filtrate and washings are diluted with 400 ml. of petroleum ether. After being kept at 5° C. for 20 hours, the mixture is filtered. The solid is dissolved in 150 ml. of hot chloroform and the solution is washed with two 30 ml. portions of 30% potassium iodide solution and two 30 ml. portions of water. Concentration of the dried chloroform layer gives amorphous product which is chromatographed on 40 g. of alumina in benzene-chloroform (1:9). Fractions showing only one zone (R$_f$ 0.28) after thin layer chromatography on alumina in the same solvent mixture are combined and concentration of the solvent gives 920 mg. of 9-(2,3,5-tri-O-benzoyl-3-C-methyl-D-ribofuranosyl)-6-benzamidopurine as an amorphus solid.

A mixture of 1.26 g. (1.8 moles) of 9-(2,3,5-tri-O-benzoyl - 3 C - methyl - β - D - ribofuranosyl)-6-benzamidopurine and 13 ml. of dry methanol is treated with a solution of sodium methoxide prepared from 70 mg. (3 mmoles) of sodium and 3 ml. of methanol. After the mixture is refluxed for 2 hours, it is concentrated and the residue is dissolved in 50 ml. of water. The pH is adjusted from 11.5 to 5.2 with a few drops of acetic acid. The solution is extracted with five 20 ml. portions of chloroform and the water layer is filtered and concentrated to dryness. The residue is dissolved in methanol and 430 mg. of impure amorphous product is precipitated with ether. The filtrate is concentrated to dryness and the residue is crystallized from a water solution. Recrystallization from 0.7 ml. of water gives 126 mg. of 3'-C-methyladenosine, M.P. 213–215° C. (transition at 165°);

$\lambda_{max}^{H_2O}$ m$\mu$ ($\epsilon \times 10^{-3}$): pH 1—257.5 (14.8), pH 7—260 (19.9), pH 13—260 (14.3); [$\alpha$]$_D$—58°, [$\alpha$]$_{578}$—61° (c. 1, H$_2$O); [$\phi$]$_{400}$—518°, [$\phi$]$_{281}$—3730° (pk.), [$\phi$]$_{264}$ 0° [$\phi$]$_{255}$+700° (tr.) (c. 0.05, MeOH); $\gamma$D$_2$O p.p.m.: 4.08 (doublet, C–1' proton), 5.43 (doublet, C–2' proton, J$_{1',2'}$ cps.), 5.83 (multiplet, C–4′ proton), 6.18 (multiplet, C–5′ protons), 8.57 p.p.m. (singlet, C–3′ methyl protons); 1.81 and 2.03 (singlets, C–2 and C–8 protons).

The corresponding 3′-C-ethyladenosine is obtained when an equivalent amount of 2,3,5-tri-O-benzoyl - 3 - C-ethyl-D-ribofuranosyl chloride or bromide is used in place of the 2,3,5-tri-O-benzoyl - 3 - C - methyl-D-ribofuranosyl bromide as the starting material in the above procedures.

EXAMPLE 36

9-(2-C-methyl-D-ribofuranosyl)-6-methylaminopurine

About 150 ml. of xylene is distilled from a suspension of 9.5 g. (19.5 mmoles) of chloromercuri - 6 - (N-methylbenzamido)purine in 500 ml. of xylene. The mixture is cooled and a solution of 2,3,5-tri-O-benzoyl-2-C-methyl-D-ribofuranosyl chloride) from 8.2 g. (14.1 mmoles) of 1,2,3,5 - tetra - O - benzoyl-2-C-methyl-β-D-ribofuranose) in 50 ml. of dry xylene is added. The reaction mixture is stirred and refluxed for 30 minutes. The hot mixture is filtered and 3 g. of unreacted starting chloromercuri purine is recovered. The filtrate is concentrated to dryness and the residual oil in 300 ml. of chloroform is washed with two 100 ml. portions of 30% potassium iodide and two 100 ml. portions of water. The residual oil obtained after removal of the chloroform is chromatographed on a short column of 140 g. of acid-washed alumina in benzenechloroform (1:9). Fractions containing only product are combined and concentrated giving 9-(2,3,5-tri-O-benzoyl-2-C - methyl - D - ribofuranosyl) - 6 - N-methylbenzamido)purine as a glass.

A suspension of 3.9 g. (5.45 mmoles) of 9-(2,3,5-tri-O - benzoyl - 2 - C - methyl-D-ribofuranosyl)-6-(N-methylbenzamido)purine in 40 ml. of dry methanol is treated with a solution made from 175 mg. (7.6 mg. atom) of sodium in 40 ml. of dry methanol and the solution is refluxed for 3.5 hours. The methanol is removed and the solution of the residue in 76 ml. of water is neutralized (pH 7.0) with acetic acid and washed with three 10 ml. portions of chloroform. The aqueous layer is concentrated by distillation to a residue of 9-(2-C-methyl-D-ribofuranosyl - 6 - methylaminopurine.

Similarly, 9-(3-C-methyl-D-ribofuranosyl) - 6 - methylaminopurine, 9 - (2-C-ethyl-D-ribofuranosyl) - 6 - methylaminopurine, or 9-(3-C-ethyl-D-ribofuranosyl)-6-methylaminopurine is obtained when an equivalent amount of 2, 3,5-tri-O-benzoyl - 3 - C - methyl-D-ribofuranosyl chloride, 2,3,5-tri-O-benzoyl-2-C-ethyl-D-ribofuranosyl chloride or 2,3,5 - tri - O - benzoyl-3-C-ethyl-D-ribofuranosyl chloride, respectively, is used in place of the 2,3,5-tri-O-benzoyl - 2 - C - methyl - β - D-ribofuranosyl chloride in the above procedures.

EXAMPLE 37

9-(2-C-methyl-D-ribofuranosyl)-2,6-diaminopurine
(2-amino-2′-C-methyladenosine)

About 100 ml. of xylene is distilled from suspension of 5.01 g. (843 mmoles) of chloromercuri 2,6-dibenzamidopurine in 370 ml. of xylene to remove the last traces of water. The suspension is cooled to room temperature and a solution of 4.55 g. (8.43 mmoles) of 2,3,5-tri-O-benzoyl-2-C-methyl-D-ribofuranosyl bromide in 37 ml. of dry xylene is added while the suspension is being stirred. The mixture is refluxed for 2 hours and filtered hot to remove insoluble material. The filtrate is diluted with 400 ml. of petroleum ether and cooled in an ice bath. The solid is removed and then dried. The product is obtained as a complex with mercuric halide. The product is dissolved in 100 ml. of chloroform and washed with two 40 ml. portions of 30% potassium iodide solution and two 40 ml. portions of water. The dried chloroform solution, dried over magnesium sulfate, is concentrated at reduced pressure to give 9 - (2,3,5 - tri - O - benzoyl - 2 - C - methyl-D-ribofuranosyl)-2,6-dibenzamidopurine.

A mixture of 1.2 g. (1.37 mmoles) of 9-(2,3,5-tri-O-benzoyl - 2 - C - methyl - D-ribofuranosyl)-2,6-dibenzamidopurine in 12 ml. of dry methanol is treated with a solution of 97 mg. (4.2 mmoles) of sodium in 12 ml. of methanol. The mixture is refluxed for 3 hours and the resultant solution is concentrated at reduced pressure. The residue is dissolved in 24 ml. of water and the pH is adjusted to about 6.5. The aqueous solution is extracted with five 10 ml. portions of chloroform to remove methyl benzoate and concentrated at reduced pressure to a residue containing 9 - (2 - C - methyl - D - ribofuranosyl)-2,6-diaminopurine.

Similarly, 9 - (3 - C - methyl - D - ribofuranosyl)-2,6-diaminopurine, 9 - ( 2 - C - ethyl - D - ribofuranosyl)2,6-diaminopurine, or 9 - (3 - C - ethyl-D-ribofuranosyl(2,6-diaminopurine is obtained when an equivalent amount of 2,3,5-tri-O-benzoyl - 3 - C - methyl - D - ribofuranosyl bromide, 2,3,5 - tri - O - benzoyl - 2 - C - ethyl-D-ribofuranosyl bromide, or 2,3,5-tri-O-benzoyl - 3 - C-ethyl - D-ribofuranosyl bromide, respectively, is used in place of the 2,3,5 - tri - O - benzoyl - 2 - C - methyl-β-D-ribofuranosyl bromide in the above procedures.

EXAMPLE 38

7 - (and 9)-(2 - C - methyl - β - D - ribofuranosyl) guanine: 7-(and 9)-(2-C-methyl-β-D-ribofuranosyl)-2-amino-6-hydroxypurine About 25 ml. of xylene is distilled from a suspension of 5.95 g. (14 mmoles) of chloromercuri-2-acetamidohypoxanthine in 175 ml. of xylene in order to remove last traces of water. The suspension is cooled to 25° C. and 14 mmoles of 2,3,5-tri-O-benzoyl-2-C-methyl-β-D-ribofuranosyl chloride in 25 ml. of dry xylene is added. The mixture is stirred and heated. At about 50° C. to 100° C. the solid changes from a granular form to flocculent. After being refluxed for one hour the hot mixture is filtered to remove a solid. Leaching the solid with three 50 ml. portions of boiling chloroform removes some soluble product and leaves insoluble starting chloromercuri derivative and inorganic salts.

The original filtrate is diluted with two volumes of petroleum ether and the solid which separates is dissolved in the chloroform solution obtained above. The chloroform solution (plus an additional 100 ml.) is washed with two 75 ml. portions of 30% potassium iodide and one 75 ml. portion of water. The dried chloroform layer is concentrated and the crude product is chromatographed on 100 g. of silica gel. Elution with a mixture of acetonemethanol gives, after removal of some mobile impurities, fractions which on concentration yield a residual solid. This material is dissolved in chloroform and washed with water. Concentration of the chloroform layer gives 2-acetamido - 7 - (2,3,5 - tri - O-benzoyl-2-C-methyl-β-D-ribofuranosyl)hypoxanthine as an amorphous solid.

Further elution of the column removes a second major component. This material is dissolved in 200 ml. of chloroform and washed with two 20-ml. portions of water. Concentration of the filtered chloroform solution under reduced pressure gives 2-acetamido-9-(2,3,5-tri-O-benzoyl-2-C-methyl-β-D-ribofuranosyl)hypoxanthine.

A suspension of 800 mg. of 2-acetamido-9-(2,3,5-tri-O-benzoyl-2-C-methyl-β-D-ribofuranosyl)hypoxanthine in 8 ml. of dry methanol is treated with a solution of 105 mg. (4.5 mg. atom) of sodium in 8 ml. of dry methanol and the mixture is refluxed for two hours. After 15 minutes of refluxing, no further change in the ultraviolet absorption spectrum can be observed. The mixture is concentrated to dryness. The residue is dissolved in 35 ml. of water and the pH is adjusted to 7 by the addition of acetic acid. The clear solution is washed with three 8 ml. portions of chloroform and the aqueous layer is concentrated to a volume of 10 ml. After being cooled for several hours, the precipitated product is removed. Recrystallization from water gives 9-(2-C-methyl-β-D-ribofuranosyl)guanine.

A suspension of 900 mg. of 2-acetamido-7-(2,3,5-tri-O-benzoyl-2-methyl-β-D-ribofuranosyl)guanine in 8 ml. of dry methanol is treated with a solution of 132 mg. (5.7 mg. atom) of sodium in 8 ml. of dry methanol and the mixture is refluxed for 3.5 hours. Periodic examination of the ultraviolet absorption spectrum indicates that the reaction is complete after 2.5 hours. The mixture is concentrated and the residue is dissolved in 40 ml. of water. The solution is washed with 15 ml. of chloroform and the pH of the aqueous phase is adjusted to 7 with acetic acid. The precipitated product (356 mg.) is filtered and washed with 5 ml. of water, 10 ml. of alcohol-ether (1:9), two 10 ml. portions of boiling chloroform and 10 ml. of ether. Recrystallization from water gives 7-(2-C-methyl-β-D-ribofuranosyl)guanine.

Similarly, 7 (and 9)-(2-C-ethyl-β - D - ribofuranosyl) guanine, 7 (and 9)-(3-C-methyl - β - D - ribofuranosyl) guanine, or 7 (and 9)-(3-C-ethyl-β - D - ribofuranosyl) guanine is obtained when an equivalent amount of 2,3,5-tri-O-benzoyl-2-C-ethyl-D-ribofuranosyl chloride, 2,3,5-tri-O-benzoyl-3-C-methyl-D-ribofuranosyl chloride, or 2,3,5-tri-O-benzoyl-3-C-ethyl-D-ribofuranosyl chloride, respectively, is used in place of the 2,3,5-tri-O-benzoyl-2-C-methyl-D-ribofuranosyl chloride in the above procedures.

EXAMPLE 39

9-(2-C-methyl-D-ribofuranosyl)-6-methylpurine

A suspension of 3.7 g. (10 mmoles) of chloromercuri 6-methylpurine [Davoll and Lowy, J. Am. Chem. Soc. 73 1650 (1951)] in 200 ml. of xylene is dried by distilling about 50 ml. of xylene. The cooled suspension is treated with 4.94 g. (10 mmoles) of 2,3,5-tri-O-benzoyl-2-C-methyl-D-ribofuranosyl chloride dissolved in 30 ml. of dry xylene. The mixture is stirred and refluxed for 2 hours and then filtered to remove insoluble material. The filtrate is diluted with 4 volumes of petroleum ether and, after being cooled for about 2 hours in an ice bath, the mixture is filtered. The solid is dissolved in 200 ml. of chloroform and washed with two 30 ml. portions of 20% aqueous potassium iodide solution. The chloroform layer is dried over anhydrous magnesium sulfate and concentrated to a residue of amorphous 9-(2,3,5-tri-O-benzoyl-2-C-methyl-D-ribofuranosyl)-6-methylpurine.

A mixture of 590 mg. (0.98 mmole) of 9-(2,3,5-tri-O-benzoyl-2-C-methyl-D-ribofuranosyl)-6-methylpurine and 50 ml. of dry methanol is treated with a solution prepared from 23 mg. (1 mg. atom) of sodium and 10 ml. of dry methanol. The mixture is refluxed for 4 hours and concentrated to dryness. The residue is dissolved in 30 ml. of water and neutralized (pH 7) with acetic acid. When the water layer is concentrated to a small volume and cooled, 9-(2-C-methyl-D-ribofuranosyl)-6 - methylpurine precipitates.

Similarly, 9-(3-C-methyl-D-ribofuranosyl)-6 - methylpurine, 9-(2-C-ethyl-D-ribofuranosyl)-6-methylpurine, or 9-(3-C-ethyl-D-ribofuranosyl)-6-methylpurine is obtained when an equivalent amount of 2,3,5-tri-O-benzoyl-3-C-methyl-D-ribofuranosyl chloride, 2,3,5-tri-O-benzoyl-2-C-ethyl-D-ribofuranosyl chloride, or 2,3,5-tri-O-benzoyl-3-C-ethyl-D-ribofuranosyl chloride, respectively, is used in place of the 2,3,5-tri-O-benzoyl-2-C-methyl-β-D-ribofuranosyl chloride in the above procedures.

EXAMPLE 40

9-(2-C-methyl-D-ribofuranosyl)-6-chloropurine

About 100 ml. of xylene is distilled from a suspension of 6.55 g. (16.8 mmoles) of chloromercuri-6-chloropurine in 460 ml. of xylene in order to remove the last traces of water. A solution of 9.05 g. (16.8 mmoles) of 2,3,5-tri-O-benzoyl-2-C-methyl-D-ribofuranosyl bromide in 40 ml. of dry xylene is added to the stirred suspension at 25° C. The mixture is refluxed for 2 hours. The hot mixture is filtered to remove insoluble material. The filtrate is concentrated to 150 ml. and diluted with 300 ml. of petroleum ether. The mixture is kept at 5° C. for one hour and filtered. The solid is washed with three 20 ml. portions of petroleum ether and dried. The crude product is dissolved in 300 ml. of hot chloroform and washed with two 80 ml. portions of 30% potassium iodide solution and two 80 ml. portions of water. The dried chloroform layer, dried over magnesium sulfate, is concentrated, and 9-(2,3, 5 - tri - O-benzoyl-2-C-methyl-D-ribofuranosyl)-6-chloropurine is obtained. The product is purified by chromatography on a short alumina column in chloroform.

A solution of 479 mg. (0.98 mmole) of 9-(2,3,5-tri-O-benzoyl-2-C-methyl-D-ribofuranosyl)-6-chloropurine in 20 ml. of cold methanol containing 2 g. of anhydrous ammonia is kept at 5° C. for 20 hours. The solution is concentrated at reduced pressure and at a temperature of less than 20° C. The residue is recrystallized from methanol to give 9-(2-C-methyl-D-ribofuranosyl)-6-chloropurine.

Similarly, 9 - (3 - C - methyl-D-ribofuranosyl)-6-chloropurine, 9-(2-C-ethyl-D-ribofuranosyl)-6-chloropurine, or 9-(3-C-ethyl-D-ribofuranosyl)-6-chloropurine is obtained when an equivalent amount of 2,3,5-tri-O-benzoyl-3-C-methyl-D-ribofuranosyl bromide, 2,3,5-tri-O-benzoyl-2-C-ethyl-D-ribofuranosyl bromide, or 2,3,5-tri-O-benzoyl-3-C-ethyl-D-ribofuranosyl bromide, respectively, is used in place of the 2,3,5-tri-O-benzoyl-2-C-methyl-D-ribofuranosyl bromide in the above procedures.

EXAMPLE 41

2′-C-methyladenosine

A mixture of 1 g. (1.6 mmoles) of 9-(2,3,5-tri-O-benzoyl-2-C-methyl-D-ribofuranosyl)-6-chloropurine and 8 g. of ammonia in 25 g. of dry methanol is heated for 10 hours at 100° C. in a sealed tube. The solution is concentrated to dryness at reduced pressure and the residue is dissolved in 25 ml. of water. The water solution is washed with two 5 ml. portions of benzene. The aqueous layer is stirred for 2.5 hours with 3.5 g. of moist Dowex II–X8, during which time the pH of the solution rises from 7 to about 9. The resin is removed and washed with three 15 ml. portions of water. The filtrate and washings are concentrated to a residue containing 2′-C-methyladenosine.

In accordance with the above procedure, but starting with 9-(2,3,5-tri-O-benzoyl-3-C-methyl-D-ribofuranosyl)-6-chloropurine, the product obtained is 3′-C-methyladenosine.

EXAMPLE 42

9-(2-C-methyl-D-ribofuranosyl)-6-methylaminopurine

A mixture of 1 g. (1.6 mmoles) of 9-(2,3,5-tri-O-benzoyl-2-C-methyl-D-ribofuranosyl)-6-chloropurine, as prepared in Example 40, and 8 g. of methylamine in 25 g. of dry methanol is heated for 10 hours at 100° C. in a sealed tube. The solution is concentrated to dryness at reduced pressure and the residue is dissolved in 25 ml. of water. The water solution is washed with two 5 ml. portions of benzene. The aqueous layer is stirred for 2.5 hours with 3.5 g. of moist Dowex II–X8, during which time the pH of the solution rises from 7 to 9. The resin is removed and washed with three 15 ml. portions of water. The filtrate and washings are concentrated to a residue containing 9 - (2 - C - methyl - D-ribofuranosyl)-6-methylaminopurine.

In accordance with the above procedure, but starting with 9 - (2,3,5 - tri-O-benzoyl-2-C-ethyl-D-ribofuranosyl)-6-chloropurine, 9-(2,3,5-tri-O-benzoyl-3-C-methyl-D-ribofuranosyl)-6-chloropurine, or 9-(2,3,5-tri-O-benzoyl-3-C-ethyl-D-ribofuranosyl)-6-chloropurine in place of the 9 - (2,3,5 - tri - O-benzoyl-2-C-methyl-D-ribofuranosyl)-6-chloropurine, there is obtained the corresponding 9-(2-C-ethyl-D-ribofuranosyl)-6-methylaminopurine, 9-(3-C-methyl - D - ribofuranosyl) - 6 - methylaminopurine, or 9-(3-D-ethyl-D-ribofuranosyl)-6-methylaminopurine, respectively.

EXAMPLE 43

9-(2-C-methyl-D-ribofuranosyl)-6-ethylaminopurine

A solution of 2.0 g. (3.2 mmoles) of 9-(2,3,5-tri-O-benzoyl-2-C-methyl-D-ribofuranosyl)-6-chloropurine, as prepared in Example 40, in 30 ml. of ethanol containing 12 ml. of ethylamine is heated in a sealed tube at 100° C. for 10 hours. After removing the solvent, the residue is dissolved in 60 ml. of water and extracted with three 15 ml. portions of ether. The aqueous layer (pH 6.5) is stirred for 1 hour with 2.5 g. of Dowex II–X8. The resin is removed and washed with four 10 ml. portions of water. The combined filtrate and washings are concentrated to a residue of 9-(2-C-methyl-D-ribofuranosyl)-6-ethylaminopurine.

In accordance with the above procedure, but starting with 9 - (2,3,5-tri-O-benzoyl-2-C-ethyl-D-ribofuranosyl)-6-chloropurine, 9-(2,3,5-tri-O-benzoyl-3-C-methyl-D-ribofuranosyl)-6-chloropurine, or 9-(2,3,5-tri-O-benzoyl-3-C-ethyl-D-ribofuranosyl)-6-chloropurine in place of the 9-(2,3,5 - tri - O-benzoyl-2-C-methyl-D-ribofuranosyl)-6-chloropurine, there is obtained the corresponding 9-(2-C-ethyl-D - ribofuranosyl)-6-ethylaminopurine, 9-(3-C-methyl-D-ribofuranosyl)-6-ethylaminopurine, or 9-(3-C-ethyl-C-ribofuranosyl)-6-ethylaminopurine, respectively.

EXAMPLE 44

9-(2-C-methyl-D-ribofuranosyl)-6-dimethylaminopurine

A suspension of 1.0 g. (1.57 mmoles) of 9-(2,3,5-tri-O-benzoyl - 2 - C - methyl - D - ribofuranosyl) - 6 - chloropurine, as prepared in Example 40, in 25 ml. of methanol containing 6.5 g. of dimethylamine is heated for 10 hours in a sealed tube at 100° C. The solution is concentrated at reduced pressure and the residue is dissolved in 25 ml. of water. The water solution is washed with five 8 ml. portions of benzene and then treated with 2 g. of Dowex II–X8 which is a strongly basic anion exchange resin having a styrene divinyl benzene polymer matrix and containing quaternary ammonium groups. It has an average particle size in the range of 50–100 mesh. The resin is filtered and washed with three 25 ml. portions of water. The filtrate is concentrated to dryness and 9-(2-C-methyl-D-ribofuranosyl)-6-dimethylaminopurine is obtained.

In accordance with the above procedure, but starting with 9 - (2,3,5 - tri - O - benzoyl - 2 - C - ethyl - D - ribofuranosyl) - 6 - chloropurine, 9 - (2,3,5 - tri - O - benzoyl-3 - C - methyl - D - ribofuranosyl) - 6 - chloropurine, or 9 - (2,3,5 - tri - O - benzoyl - 3 - C - ethyl - D - ribofuranosyl) - 6 - chloropurine in place of the 9-(2,3,5-tri-O-benzoyl - 2 - C - methyl - D - ribofuranosyl) - 6 - chloropurine, there is obtained the corresponding 9-(2-C-ethyl-D-ribofuranosyl) - 6 - dimethylaminopurine, 9 - (3 - C-methyl - D - ribofuranosyl) - 6 - dimethylaminopurine, or 9 - (3 - C - ethyl - D - ribofuranosyl) - 6 - diethylaminopurine, respectively.

EXAMPLE 45

9-(2-C-methyl-D-ribofuranosyl)purine

A solution of 1 g. (1.6 mmoles) of 9-(2,3,5-tri-O-benzoyl - 2 - C - methyl - D - ribofuranosyl) - 6 - chloropurine, as prepared in Example 40, in 17 ml. of dioxane with 80 mg. (2.0 mmoles) of magnesium oxide and 0.5 g. of 5% palladium-on-charcoal catalyst is shaken for 98 hours in an atmosphere of hydrogen at 25° C. The mixture is filtered and concentrated by distillation at reduced pressure to a residue containing 9-(2,3,5-tri-O-benzoyl-2-C-methyl-D-ribofuranosyl)purine.

A solution of 400 mg. (0.69 mmole) 9-(2,3,5-tri-O-benzoyl - 2 - C - methyl - D - ribofuranosyl)purine in 8 ml. of dry methanol is treated with a solution made from 23 mg. (1 mg. atom) of sodium and 8 ml. of dry methanol. The pale yellow solution is refluxed for 3 hours and concentrated to dryness at reduced pressure. The residue is dissolved in 15 ml. of water and the pH is adjusted to 6.5 with acetic acid. The solution is extracted with four 5 ml. portions of chloroform and the water phase is concentrated to dryness at reduced pressure to a residue containing 9-(2-C-methyl-D-ribofuranosyl)purine.

The corresponding 9 - (2 - C - ethyl - D-ribofuranosyl) purine, 9 - (3 - C - methyl - D - ribofuranosyl)purine or 9 - (3 - C - ethyl - D - ribofuranosyl)purine is obtained when equivalent amounts of 9 - (2,3,5 - tri - O - benzoyl-2 - C - ethyl - D - ribofuranosyl) - 6 - chloropurine, 9-(2,3,5 - tri - O - benzoyl - 3 - C - methyl - D-ribofuranosyl)-6-chloropurine, or 9-(2,3,5-tri - O - benzoyl-3-C-ethyl-D-ribofuranosyl)-6-chloropurine is employed as starting material in the above procedures.

EXAMPLE 46

9-(2-C-methyl-D-ribofuranosyl)purine-6-thiol

A suspension of 1.25 g. (1.96 mmoles) of 9-(2,3,5-tri-O-benzoyl-2-C-methyl - D-ribofuranosyl)-6-chloropurine, prepared as in Example 40, and 307 mg. (4.0 mmoles) of thiourea in 3 ml. of ethanol is refluxed for 40 minutes. After 5 minutes a clear, colorless solution is obtained which becomes yellow in 15 minutes and shortly thereafter colorless crystals of 9-(2,3,5 - tri - O-benzoyl-2-C-methyl - D - ribofuranosyl)purine - 6 - thiol crystallize out of solution.

A suspension of 400 mg. (0.64 mmole) of 9-(2,3,5-tri-O-benzoyl - 2 - C - methyl - D - ribofuranosyl)purine-6-thiol in 3.5 ml. of dry methanol is treated with a solution made from 19.5 mg. of sodium and 3.5 ml. of dry methanol is added. Complete solution occurs immediately. The solution is refluxed for three hours. The solution is concentrated by distillation at reduced pressure. The residue is dissolved in 6 ml. of water and the pH of the solution is adjusted to 9 with acetic acid. The aqueous mixture is extracted with four 1.5 ml. portions of methylene chloride. The water layer is concentrated by distillation to a volume of 4 ml. and the pH is adjusted to 4 with acetic acid. The concentration of the solution gives a residue containing 9-(2-C-methyl-D-ribofuranosyl)purine-6-thiol.

The corresponding 9 - (2 - C - ethyl - D-ribofuranosyl) purine-6-thiol, 9 - (3 - C - methyl - D - ribofuranosyl) purine - 6 - thiol, or 9 - (3 - C - ethyl - D - ribofuranosyl) purine - 6 - thiol is obtained when equivalent amounts of 9 - (2,3,5 - tri - O - benzoyl - 2 - C - ethyl - D - ribofuranosyl) - 6 - chloropurine, 9 - (2,3,5 - tri - O - benzoyl-3-C - methyl - D - ribofuranosyl) - 6 - chloropurine, or 9-(2,3,5 - tri - O - benzoyl - 3 - C - ethyl - D-ribofuranosyl)-6-chloropurine, respectively, is employed as starting material in the above procedures.

EXAMPLE 47

9-(2-C-methyl-D-ribofuranosyl)-6-methylthiopurine

A boiling mixture of 605 mg. (1.9 mmoles) of 9-(2-C-methyl - D - ribofuranosyl) - 6 - chloropurine in 30 ml. of anhydrous methanol is treated with a solution prepared by saturating 20 ml. of 0.1 N sodium methoxide in methanol with methyl mercaptan. After being refluxed for about 30 minutes, the solution is cooled and concentrated to dryness. The residue is dissolved in hot water and on cooling, 9 - (2 - C - methyl - D - ribofuranosyl)-6-methylthiopurine separates.

Similarly, 9 - (2 - C - methyl - D - ribofuranosyl) - 6-methylthiopurine, 9 - (3 - C - methyl - D - ribofuranosyl)-6-methylthiopurine or 9-(3-C-ethyl-D-ribofuranosyl)-6-methylthiopurine is obtained when an equivalent amount of the 2-C-methyl-, 3-C-methyl-, or 3-C-ethyl-starting compound is used.

EXAMPLE 48

2'-C-methyl-2-fluoroadenosine

A solution of 670 mg. (2.26 mmoles) of 2-amino-2'-methyladenosine, as prepared in Example 37, in 6.8 ml. of 48% aqueous $HBF_4$ at 0° C. is cooled to —10° C., vigorously stirred, and 0.6 ml. of a solution containing 300 mg. of $KNO_2$ is added in 0.05 ml. portions. The temperature is lowered to —30 to —40° C. and stirring is continued for 15 minutes. The pH of the reaction mixture is adjusted to 4 by adding 3.1 N KOH dropwise at —5 to —10° C. The neutralization is continued to pH 6 at 0° C. During the neutralization, a total of 17 ml. of butanol-saturated water is added to facilitate stirring. After being stirred at 25° C. for 1 hour, the reaction solution is extracted with four 35 ml. portions of butanol-saturated water. The combined extracts are washed with four 15 ml. portions of water-saturated butanol. Concentration of the butanol layer gives a residue which is purified by chromatography on 25 g. of silica gel in mixtures of acetone and ethanol. Fractions containing only the desired product are combined and concentrated. The residue is dissolved in 100 ml. of ethanol, concentrated to a small volume and cooled to obtain crystalline 2'-C-methyl-2-fluoroadenosine.

In accordance with the above procedure, but starting with 2-amino-2'-C-ethyladenosine, 2-amino-3'-C-methyladenosine, or 2-amino-3'-C-ethyladenosine in place of 2-amino-2'-C-methyladenosine, there is obtained the corresponding 2 - fluoro-2'-C-ethyladenosine, 2-fluoro-3'-C-methyladenosine, or 2-fluoro-3'-C-ethyladenosine, respectively.

EXAMPLE 49

1 - (2,3,5 - tri-O-benzoyl-2-C-methyl-β-D-ribofuranosyl)-4 - methoxy - 2(1H)-pyrimidinone and 1-(2,3,5-tri-O-benzoyl-2-C-methyl-β-D-ribofuranosyl)uracil A solution of 5.4 g. of 2,3,5-tri-O-benzoyl-2-C-methyl-D-ribofuranosyl chloride in 50 ml. of dry toluene is added to a solution of 2.8 g. (20 mmoles) of 2,4-dimethoxypyrimidine in 50 ml. of toluene. The solution is refluxed for 5 days, after which time the solvent is removed at reduced pressure. The residue (8.7 g.) is dissolved in 200 ml. of ether and washed with three 50-ml. portions of cold 5% hydrochloric acid, two 50-ml. portions of cold, saturated sodium hydrogen carbonate, and finally with several 25-ml. portions of cold water.

The dry (anhydrous MgSO₄) ether solution is concentrated at reduced pressure to a viscous syrup (5.35 g.). The syrup is chromatographed on 200 g. of silica gel in benzene-ethyl acetate (19:1). After the elution of several by-products, fractions containing the desired product [$R_f$ 0.2—on thin layer chromatography or silica in benzene-ethyl acetate (9:1)] are obtained. The solutions are combined and concentrated at reduced pressure to give 1.6 g. (50%) of 1-(2,3,5-tri-O-benzoyl-2-C - methyl-β-D-ribofuranosyl)-4-methoxy-2(1H)-pyrimidinone; $[\alpha]_D$ —21° (c. 1, chloroform), $\lambda_{max.}^{EtOH}$ mμ($\epsilon \times 10^{-3}$): 229 (42.6), 275 (9.1), 280 (inf.) (8.3).

Further elution of the column gives fractions containing a second product. This material is rechromatographed and gizes 89 mg. of 1-(2,3,5-tri-O-benzoyl-2-C-methyl-β-D-ribofuranosyl)uracil; M.P. 202° C. (transition at 185°–195° C.), $[\alpha]_D$ —23° (c., 1 in CDCl₃);

$\lambda_{max.}^{EtOH}$ mμ ($\epsilon \times 10^{-3}$) —255 (15.2), 230 (43.6).

In accordance with the above procedure, but replacing the 2,3,5 - tri - O - benzoyl-2-C-methyl-D-ribofuranosyl chloride with an equivalent amount of 2,3,5-tri-O-benzoyl - 2 - C - ethyl-D-ribofuranosyl chloride, 2,3,5-tri-O-benzoyl-3-C-methyl-D-ribofuranosyl chloride, or 2,3,5 - tri - O-benzoyl-3-C-ethyl-D-ribofuranosyl chloride the corresponding 2-C-ethyl, 3-C-methyl or 3-C-ethyl compounds are obtained.

EXAMPLE 50

2'-C-methyluridine

A solution of 20 mg. (0.035 mmole) of 1-(2,3,5-tri-O-benzoyl-2-C-methyl-β-D-ribofuranosyl)uracil as prepared in Example 49 is added to a solution prepared from 1.6 mg. (0.07 mg. atom) of sodium and 2 ml. of methanol. The mixture is refluxed for 30 minutes and concentrated to dryness. The residue is dissolved in 2 ml. of water and washed with three 1-ml. portions of ether. Concentration of the water layer gives a residue of 2'-C-methyluridine.

Similarly, the corresponding 2'-C-ethyluridine, 3'-C-methyluridine, or 3'-C-ethyluridine is obtained when in place of the 1-(2,3,5-tri-O-benzoyl-2-C-methyl-β-D-ribofuranosyl)uracil, the 1-(2,3,5-tri-O-benzoyl-2-C-ethyl-β-D - ribofuranosyl)uracil, 1 - (2,3,5 - tri-O-benzoyl-3-C-methyl - β-D-ribofuranosyl)uracil, or 1-(2,3,5-tri-O-benzoyl-3-C-ethyl-β-D-ribofuranosyl)uracil is used as the starting material.

EXAMPLE 51

2' - C-methylcytidine from 1 - (2,3,5-tri-O-benzoyl-2-C-methyl - β - D - ribofuranosyl) - 4-methoxy-2(1H)-pyrimidinone A solution of 1.0 g. (1.7 mmoles) of 1-(2,3,5-tri-O-benzoyl - 2 - C - methyl-β-D-ribofuranosyl)-4-methoxy-2(1H)-pyrimidinone, as prepared in Example 49, in 14 ml. of methanol saturated with ammonia at 0° C. is heated in a sealed tube at 100° C. for 17 hours. The solvent is removed at reduced pressure, and the residue is dissolved in 30 ml. of water. A small amount of benzamide is removed by filtration, and the aqueous filtrate is extracted with five 50 ml. portions of ether. The water solution is concentrated at reduced pressure at a temperature of less than 40° C., and the residue (0.5 g.) is crystallized from methanol. Recrystallization from methanol gives 394 mg. (90%) of 2'-C-methylcytidine, M.P. 243–245° C. (transition between 140 and 170° C.), $[\alpha]_D$+91° (c. 1, water).

Similarly, 2'-C-ethylcytidine, 3'-C-methylcytidine, or 3'-C-ethylcytidine is obtained when in place of the 1-(2,3,5 - tri - O - benzoyl-2-C-methyl-β-D-ribofuranosyl)-4-methoxy-2(1H)-pyrimidinone the corresponding 1-(2,3,5-tri-O-benzoyl-2-C-ethyl-β - D - ribofuranosyl) - 4 - methoxy-2(1H)-pyrimidinone, 1-(2,3,5-tri-O-benzoyl-3-C-methyl-β-D-ribofuranosyl)-4-methoxy-2(1H)-pyrimidinone, or 1 - (2,3,5 - tri - O - benzoyl-3-C-ethyl-β-D-ribofuranosyl)-4-methoxy-2(1H)-pyrimidinone is used as the starting material.

EXAMPLE 52

2'-C-methylcytidine from 1-(2,3,5-tri-O-benzoyl-2-C-methyl-β-D-ribofuranosyl)-4-acetamidopyrimidine 2,3,5-tri-O-benzoyl-2-C-methyl-D-ribofuranosyl chloride in 75 ml. of dry xylene is added to a suspension of 527 mg. (2 mmoles) of N-acetylcytosine mercury in 75 ml. of dry xylene at 100° C. The mixture is heated at the reflux temperature and stirred for 30 minutes. The reaction solution is concentrated to 35 ml., cooled, and treated with 175 ml. of petroleum ether; and then further cooled in an ice-bath. The precipitated solid is removed, dissolved in 100 ml. of chloroform, and then washed with three 40-ml. portions of 30% potassium iodide solution and two 40-ml. portions of water. The chloroform solution is concentrated, and the residue (1.2 g.) is chromatographed on a short column of 40 g. of silica gel in chloroform-ethyl acetate (1:1). The eluant is monitored by thin layer chromatography (TLC) on silica plates in chloroform-ethyl acetate (1:1). The first several fractions contain two reaction products of $R_f$ (TLC) 0.8 and 0.96. Later fractions contain a reaction product showing an $R_f$ (TLC) of 0.23. These fractions are combined and concentrated to give 100 mg. (13% based on N-acetylcytosine mercury) of 1-(2,3,5-tri-O-benzoyl-2-C-methyl - β - D-ribofuranosyl)-4-acetamido-2(1H)-pyrimidinone as a glass; $[\alpha]_D$ —46° (c. 0.86, chloroform), $\lambda_{max.}^{EtOH}$ mμ ($\epsilon \times 10^{-3}$): 231 (43.0), 273 inf. (8.0), 2825 (7.3), 300 (6.1).

The first fractions to be removed from the chromatographed column are combined and concentrated at reduced pressure. The residue (1.05 g.) is then rechromatographed on a short column of 40 g. of silica gel in benzene-ethyl acetate (19:1). The first several fractions yield 200 mg. of several by-products, followed by fractions containing 600 mg. of product. Crystallization twice from methanol gives 400 mg. (52%) of 2-(2,3,5 - tri - O - benzoyl-2-C-methyl-$\beta$-D-ribofuranosyloxy)-4-acetamidopyrimidine: M.P. 99–100° C., $[\alpha]_D$ +30.2° (c. 1, chloroform), $\lambda_{max.}^{EtOH}$ m$\mu$ ($\epsilon$ x 10$^{-3}$): 230 (49.5), 274 (14.5).

A solution of 100 mg. (0.17 mmole) of 2-(2,3,5-tri-O - benzoyl - 2 - C - methyl-D-ribofuranosyloxy)-4-acetamidopyrimidine in 20 ml. of dry xylene containing 180 mg. (0.5 mmole) of mercuric bromide is refluxed for 4 hours. The hot xylene solution is filtered, and the filtrate is concentrated at reduced pressure. The residue is added to 20 ml. of chloroform, and some insoluble material is removed. The chloroform solution is washed with three 15-ml. portions of 30% potassium iodide solution and three 15-ml. portions of water. Concentration of the chloroform layer gives 80.5 mg. of a residual glass. The residue is chromatographed on a short silica gel column in benzene-ethyl acetate (1:1). After removal of a by-product, fractions containing the desired 1-(2,3,5 - tri - O-benzoyl-2-C-methyl-$\beta$-D-ribofuranosyl)-4-acetamido-2(1H)-pyrimidinone are obtained.

A solution of 47 mg. (0.08 mmole) of 1-(2,3,5-tri-O-benzoyl-2-C-methyl-$\beta$ - D - ribofuranosyl) - 4 - acetamidopyrimidine in 4 ml. of methanol saturated with ammonia at 0° C. is heated in a sealed tube at 100° C. for 17 hours. The solution is concentrated at reduced pressure, and the residue is dissolved in 10 ml. of water and extracted with four 2-ml. portions of chloroform. The water layer is freeze-dried. The residue is then redissolved in 10 ml. of water and extracted with five 10-ml. portions of ether. Concentration of the water layer at reduced pressure gives 17 mg. of 2'-C-methylcytidine having properties identical with those of 2'-C-methylcytidine having properties identical with those of 2'-C-methylcytidine prepared in Example 49.

Similarly, the corresponding 2'-C-ethylcytidine, 3'-C-methylcytidine, or 3'-C-ethylcytidine is obtained when in place of the 2,3,5-tri-O-benzoyl-2-C-methyl-D-ribofuranosyl chloride starting material in the above procedure there is employed equivalent amounts of 2,3,5-tri-O-benzoyl-2-C-ethyl-D-ribofuranosyl chloride, 2,3,5-tri-O-benzoyl-3-C-methyl-D-ribofuranosyl chloride, or 2,3,5-tri-O-benzoyl-3-C-ethyl-D-ribofuranosyl chloride.

EXAMPLE 53

1-(3-C-methyl-$\beta$-D-ribofuranosyl)cytosine [3'-C-methylcytidine] and 1-(3-C-methyl-$\alpha$-D-ribofuranosyl)cytosine A mixture of 4.08 mmoles of 2,3,5-tri-O-benzoyl-3-C-methyl-$\alpha$(and $\beta$)-D-ribofuranosyl bromide and 1.3 g. (9.27 mmoles) of 2,4-dimethoxypyrimidine in 75 ml. of dry methylene chloride is kept at room temperature for 5 days. Thin layer chromatography on alumina in chloroform-benzene (3:1) shows zones (visualized with iodine vapor) at R$_f$ 0.2 ($\alpha$-anomer of product), 0.6 ($\beta$-anomer of product), 0.8 (unreacted pyrimidine). The reaction mixture is diluted with 50 ml. of methylene chloride, and then extracted with three 30-ml. portions of cold 5% hydrochloric acid and 30 ml. of cold 5% potassium hydrogen carbonate. The methylene chloride solution is dried over anhydrous magnesium sulfate and concentrated to dryness. The residue (2.53 g.) is chromatographed on 50 g. of alumina (acid-washed) eluting with, first benzene-chloroform (4:1), then benzene-chloroform (1:4), and finally chloroform. Fractions containing the ($\beta$-anomer) are pooled and concentrated. The residue is crystallized from benzene-petroleum ether (1:1), to give a total of 1.07 g. (45%) of 1-(2,3,5-tri-O-benzoyl-3-C-methyl-$\beta$-D-ribofuranosyl)-4-methoxy-2(1H)-pyrimidinone: M.P. 84–90° C.; $[\alpha]_D$ —76° (c., 1 in CHCl$_3$);

$\lambda_{max.}^{MeOH}$ m$\mu$ ($\epsilon$X10$^{-3}$)—230 (43.4), 275 (9.4), 280 (8.6). Later column fractions containing the $\alpha$-anomer of the product are pooled and concentrated. Crystallization of the residue (120 mg.) gives purified 1 - (2,3,5 - tri - O-benzoyl-3-C-methyl - $\alpha$ - D - ribofuranosyl) - 4 - methoxy - 2(1H)-pyrimidinone: M.P. 206–209° C.; $[\alpha]_D$ —180° (c., 0.5 in CHCl$_3$);

$\lambda_{max.}^{MeOH}$ m$\mu$ ($\epsilon$X10$^{-3}$)—229 (38.0), 275 (9.3), 280 (8.6).

A mixture of 500 mg. (0.856 mmole) of 1-(2,3,5-tri-O - benzoyl - 3 - C - methyl - $\beta$ - D - ribofuranosyl) - 4-methoxy-2(1H)-pyrimidinone in 7.5 ml. of methanol, previously saturated with ammonia at 0° C., is shaken for 16 hours at 100° C. in a sealed tube. The contents of the tube are concentrated, and the residual oil (1.07 g.) is dissolved in 50 ml. of water. The aqueous mixture is extracted with three 30-ml. portions of ether to remove benzamide. The water solution is concentrated to dryness and the product crystallizes. The solid is dissolved in methanol, filtered and concentrated. On cooling 201 mg. (92%) of 3'-C-methylcytidine is obtained: M.P. 235–238° C.; $[\alpha]_D$ +4° (c., 0.5 in H$_2$O);

$\lambda_{max.}^{H_2O}$ m$\mu$ ($\epsilon$X10$^{-3}$), pH 1—212.5 (10.6), 279 (12.9); pH 7—232.5 (8.1), 271 (8.9); pH 13—230 (8.2), 271 (8.9).

Similarly, the corresponding 3'-C-ethylcytidine, the 2'-C-methylcytidine or the 2'-C-ethylcytidine is obtained when in place of the 2,3,5-tri-O-benzoyl-3-C-methyl-$\alpha$ (and $\beta$)-ribofuranosyl bromide starting material an equivalent amount of the appropriate 3-C-ethyl, 2-C-methyl, or 2-C-ethyl starting material is used.

A mixture of 50 mg. (0.085 mmole) of 1-(2,3,5-tri-O-benzoyl - 3 - C - methyl - $\alpha$ - D - ribofuranosyl) - 4-methoxy 2(1H)-pyrimidinone and 3 ml. of methanol, previously saturated with ammonia at 0° C., is shaken for 16 hours at 100° C. in a sealed tube. The contents of the tube are concentrated to dryness and the residue (50 mg.) is dissolved in 4 ml. of water. The water solution is extracted with three 3-ml. portions of ether. The water layer is filtered and concentrated to a solid residue. Crystallization of the residue from 2.5 ml. of methanol gives about 20 mg. of 1-(3-C-methyl-$\alpha$-D-ribofuranosyl)-cytosine: M.P. 250–258° C.

Similarly, the corresponding 1-(2-C-methyl)-$\alpha$-D-ribofuranosyl)cytosine, 1 - (2 - C - ethyl)-$\alpha$-D-ribofuranosyl) cytosine, or 1-(3-C-ethyl)-$\alpha$-D-ribofuranosyl)cytosine is obtained when in place of the 1-(2,3,5-tri-O-benzoyl-3-C-methyl $\alpha$ - D - ribofuranosyl - 4 - methoxy - 2(1H)-pyrimidinone in the above procedure there is used an equivalent amount of the appropriate 2-C-methyl, 2-C-ethyl or 3-C-ethyl starting material.

EXAMPLE 54

1-(2,3,5-tri-O-benzoyl-2-C-methyl-$\beta$-D-ribofuranosyl)-5-fluoro-4-methoxy-2(1H)-pyrimidinone A solution of 4.8 g. (9.7 mmoles) of 2,3,5-tri-O-benzoyl-2-C-methyl-$\beta$-D-ribofuranosyl chloride in 18 ml. of dry toluene is added to 3.5 g. (22.2 mmoles) of 2,4-dimethoxy-5-fluoropyrimidine and the mixture is refluxed for 96 hours. The toluene solution is concentrated, and the residue is dissolved in 100 ml. of ether and extracted with three 50-ml. portions of 4 N hydrochloric acid, three 50-ml. portions of saturated sodium hydrogen carbonate, and finally with water. The ether solution is concentrated, and the residue (6.2 g.) is chromatographed on 150 g. of silicia gel in benzene-ethyl acetate (19:1). After the elution of several by-products (R$_f$ 0.8, 0.7, 0.6, 0.5 and 0.39—thin layer chromatography on silica gel in benzene-ethyl acetate (19:1), fractions containing a total of 3.9 g. of product ($R_f$ 0.23—TLC) are obtained. Crystallization from 5 ml. of benzene and 50 ml. of ether affords 3.2 g. (55%) of 1-(2,3,5-tri-O-benzoyl-2-C-methyl-β-D-ribofuranosyl) - 5 - fluoro - 4 - methoxy - 2(1H) - pyrimidinone: M.P. 157–159° C.; $[\alpha]_D$ —14°, $[\alpha]_{478}$ —14° (c. 1, chloroform);

$\lambda_{max.}^{EtOH}$ mμ ($\epsilon \times 10^{-3}$), 229 (49.4), 277 (8.9), 283 (9.0), 293 inf. (6.4).

Analysis.—Calcd. for $C_{32}H_{27}FN_2O_9$: C, 63.79; H, 4.52; F, 3.15; N, 4.65. Found: C, 63.91; H, 4.34; F, 2.80; N, 4.35.

In accordance with the above procedure but replacing the 2,4-dimethoxy-5-fluoropyrimidine with an equivalent amount of 2,4-dimethoxy-5-trifluoromethylpyrimidine, or 2,4-dimethoxy-5-methylpyrimidine there is obtained the corresponding 1 - (2,3,5 - tri - O - benzoyl - 2 - C -methyl - β - D - ribofuranosyl) - 5 - trifluoromethyl - 4 - methoxy-2(1H)-pyrimidinone, or 1-(2,3,5-tri-O-benzoyl-2-C-methyl - β - D - ribofuranosyl) - 5 - methyl - 4 - methoxy-2(1H)-pyrimidinone.

EXAMPLE 55

5-fluoro-1-(2-C-methyl-β-D-ribofuranosyl)-cytosine
[5-fluoro-2'-C-methylcytidine]

A solution of 80 mg. (0.13 mmole) of 1-(2,3,5-tri-O-benzoyl -2 - C - methyl - β - D - ribofuranosyl) - 5-fluoro-4-methoxy-2(1H)-pyrimidinone in 7 ml. of methanol, saturated with ammonia at 10° C., is heated at 100° C. in a sealed tube for 18 hours. The reaction solution is concentrated at reduced pressure, and the residue is dissolved in 10 ml. of water and extracted with three 5 ml. portions of ether. The aqueous phase is concentrated at reduced pressure and the residue, when crystallized from 0.2 ml. of methanol plus 0.01 ml. of ether, affords 24 mg. (67%) of 5-fluoro-2'-C-methylcytidine: M.P. 247–249° C.; $R_f$ 0.78 —TLC on cellulose in water; $[\phi]_{400}$ +1200°, $[\phi]_{302}$ +15,700° (pk.), $[\phi]_{281}$ 0°, $[\phi]_{255}$ —18,700° (tr.), $[\phi]_{242}$ —16,300° (pk.), $[\phi]_{233}$ —17,700° (tr.), $[\phi]_{219}$ 0°;

$\lambda_{max.}^{H_2O}$ mμ($\epsilon \times 10^{-3}$): pH 1—214 (9.7), 292 (11.1); pH 7—2.3 (8.9), 238 (7.7), 282.5 (8.0); pH 13—237 (7.7), 283 (8.1).

Analysis.—Calcd. for $C_{10}H_{14}FN_3O_5$: C, 43.63; H, 5.13; N, 15.27. Found: C, 43.38; H, 5.25; N, 14.98.

The corresponding 5-trifluoromethyl-2'-C-methylcytidine is obtained when an equivalent amount of 1-(2,3,5-tri - O - benzoyl - 2 - C - methyl - β - D - ribofuranosyl)-5 - trifluoromethyl - 4 - methoxy-2(1H)-pyridiminone is used in place of 1-(2,3,5-tri-O-benzoyl-2-C-methyl-β - D - ribofuranosyl) - 5 - fluoro - 4 - methoxy - 2(1H)-pyrimidinone.

EXAMPLE 56

5-fluoro-1-(2-C-methyl-β-D-ribofuranosyl)uracil-
[5-fluoro-2'-C-methyluridine]

A suspension of 602.5 mg (1.0 mmole) of 1-(2,3,5-tri - O - benzoyl - 2 - C - methyl - β - D - ribofuranosyl)-5-fluoro-4-methoxy-2(1H)-pyrimidinone in 20 ml. of methanol is treated with 160 mg. (4.0 mmoles) of sodium hydroxide and 2 ml. of water. The mixture is refluxed for 45 minutes and the solution is concentrated at reduced pressure. The residue is dissolved in 20 ml. of water, and small portions of Dowex 50×4 (H+) resin is added until the pH of the solution is 4.0. The resin and precipitated benzoic acid is removed and washed well with water. The combined filtrates are extracted with six 25 ml. portions of ether. The water layer is concentrated at reduced pressure, and the residue (300 mg.) in 5 ml. of methanol is treated with 1 ml. of ether. The precipitated solid is removed, and the filtrate is concentrated to 0.3 ml. and kept at 5° C. for 18 hours. The solid (107 mg. M.P. 196–205° C.) obtained, when recrystallized from 0.5 ml. of methanol and 0.5 ml. of ether affords 74 mg. (27%) of 5-fluoro-2'-C-methyluridine: M.P. 205–207° C.

EXAMPLE 57

5-bromo-2'-methyluridine

A solution of 45.6 mg. (0.2 mmole) of 2'-methyluridine in 0.4 ml. of water is treated dropwise with a solution of bromine in water until a pale yellow color persists. Nitrogen is blown through the solution to remove excess bromine, and the solution is lyophilized. The residual 1-(2-methyl-β-D-ribofuranosyl)-4-hydroxy-5,6-dibromo-2(1,5,6H)pyrimidone is dissolved in 1.5 ml. of ethanol. The solution is refluxed and hydrogen bromide is evolved. An ultraviolet absorption maximum at 282 mμ is generated during the heating period. The solution is concentrated at reduced pressure and the residual oil dissolved in water and washed with two 1-ml. portions of ether. The water layer is concentrated to dryness. The product is dissolved in 2 ml. of water and treated with 30 mg. of decolorizing carbon. After removal of the carbon, the colorless water solution is concentrated to dryness. Methanol is removed from the residue (53.5 mg.) at reduced pressure several times to eliminate the last traces of water. Trituration of the residue with ether affords 2-bromo-2'-methyluridine.

In accordance with the above procedure, but starting with 2'-ethyl-, 3'-methyl-, or 3'-ethyluridine there is obtained 2'-ethyl-, 3'-methyl-, or 3'-ethyl-5-bromo-uridine.

EXAMPLE 58

2'-C-methyl-5-methylaminouridine

A solution of 3.9 g. (12 mmoles) of 5-bromo-3'-C-methyluridine in 40 ml. of anhydrous liquid methylamine is heated at 80° C. for 18 hours in a sealed tube. The amine is evaporated and the residue is dissolved in water and added to a column of 400 ml. of Dowex 50W×4 (H+). The column is washed well with distilled water to remove neutral, ultraviolet absorbing materials and the product is eluted with 0.5 N ammonium hydroxide. Concentration of the ammonium hydroxide eluant gives a residue on 2'-C-methyl-5-methylaminouridine.

If in the above procedure the 5-bromo-2'-C-methyluridine is replaced by 5-bromo-2'-C-ethyluridine, 5-bromo-3'-C-methyluridine, or 5-bromo - 3' - C - ethyluridine there is obtained 2'-C-ethyl-5-methylaminouridine, 3'-C-methyl-5-methylaminouridine, or 3'-C-ethyl - 5 - methylaminouridine.

When in the above procedure the methylamine is replaced by ethylamine, dimethylamine, or methanol saturated at 0° C. with ammonia, there is obtained 2'-C-methyl - 5 - ethylaminouridine. 2'-C-methyl-5-dimethylaminouridine. or 2'-C-methyl-5-aminouridine.

EXAMPLE 59

2'-C-methyl-5-trifluoromethyluridine

A solution of 1 g. of 1-(2,3,5-tris-O-benzoyl-2-C-methyl-β-D-ribofuranosyl)-4 - methoxy - 5 - trifluoromethyl-2(1H)-pyrimidinone, as prepared in Example 54, in 50 ml. of methanol containing 1 ml. of concentrated hydrochloric acid is kept at 25° C. for several days. The solution is concentrated to dryness and a residue containing 2'-C-methyl-5-trifluoromethyluridine is obtained.

When the 1-(2,3,5-tri-O-benzoyl-2-C-methyl - β - D-ribofuranosyl)-4-methoxy - 5 - trifluoromethyl - 2(1H)-pyrimidinone used above is replaced by 1-(2,3,5-tri-O-benzoyl - 3 - C-methyl-β-D-ribofuranosyl)-4-methoxy-5-trifluoromethyl - 2(1H) - pyrimidone, 1 - (2,3,5-tri-O-benzoyl-2-C-ethyl-β-D-ribofuranosyl)-4-methoxy - 5 - trifluoromethyl - 2(1H) - pyrimidinone, or 1-(2,3,5-tri-O-benzoyl-3-C-ethyl-β-D-ribofuranosyl)-4-methoxy - 5 - trifluoromethyl-2(1H)-pyrimidinone there is obtained 3'-C-methyl - 5 - trifluoromethyluridine, 2'-C-ethyl-5-trifluoromethyluridine, or 3'-C-ethyl-5-trifluoromethyluridine respectively.

EXAMPLE 60

1 - (2,3,5 - tri-O-benzoyl-2-C-methyl-β-D-ribofuranosyl)-5-fluoro-4-methoxy-2(1H)-pyrimidinone A solution of 4.8 g. (9.7 mmoles) of 2,3,5-tri-O-benzoyl-2-C-methyl-β-D-ribofuranosyl chloride in 18 ml. of dry toluene is added to 3.5 g. (22.2 mmoles) of 2,4-dimethoxy-5-fluoropyrimidine and the mixture is refluxed for 96 hours. The toluene solution is concentrated and the residue is dissolved in 100 ml. of ether and extracted with three 50-ml. portions of 4 N hydrochloric acid and three 50-ml. portions of saturated sodium hydrogen carbonate and finally with water. The ether solution is concentrated and the residue (6.2 g.) is chromatographed on 150 g. of silica gel in benzene-ethyl acetate (19:1). After the elution of several by-products ($R_f$ 0.8, 0.7, 0.6, 0.5 and 0.39—thin layer chromatography on silica gel in benzene-ethyl acetate, 19:1), fractions containing a total of 3.9 g. of product ($R_f$ 0.24-TLC) are obtained. Crystallization from 5 ml. of benzene and 50 ml. of ether gives 3.2 g. (55%) of 1-(2,3,5-tri-O-benzoyl-2-C-methyl-β-D-ribofuranosyl) - 5-fluoro-4-methoxy-2(1H)-pyrimidinone: M.P. 157–159° C.; $[\alpha]_D$ —14°, $[\alpha]_{578}$ —14° (c. 1, chloroform);

$\lambda_{max.}^{EtOH}$ m$\mu$ ($\epsilon \times 10^{-3}$), 229 (49.4), 277 (8.9), 283 (9.0), 293 infl. (6.4).

*Analysis.*—Calcd. for $C_{32}H_{27}FN_2O_9$: C, 63.91; H, 4.34; F, 2.80; N, 4.35. Found: C, 63.79; H, 4.52; F, 3.15; N, 4.65.

When the 2,3,5 - tri - O - benzoyl-2-C-methyl-β-D-ribofuranosyl chloride in the above procedure is replaced by 2,3,5 - tri-O-benzoyl-2-C-ethyl-β-D-ribofuranosyl chloride, 2,3,5 - tri - O - benzoyl-3-C-methyl-β-D-ribofuranosyl chloride, or 2,3,5 - tri - O-benzoyl-3-C-ethyl-β-D-ribofuranosyl chloride there is obtained, respectively, 1-(2,3,5-tri-O-benzoyl - 2 - C - ethyl - β - D-ribofuranosyl)-5-fluoro-4-methoxy-2(1H)-pyrimidinone, 1,(2,3,5-tri-O-benzoyl-3-C-methyl - β - D-ribofuranosyl)-5-fluoro-4-methoxy-2(1H)-pyrimidinone, or 1-(2,3,5 - tri - O-benzoyl-3-C-ethyl-β-D-ribofuranosyl)-5-fluoro-4-methoxy-2(1H)-pyrimidinone.

EXAMPLE 61

5 - fluoro - 1 - (2-C-methyl-β-D-ribofuranosyl)cytosine [5-fluoro-2'-C-methylcytidine]

A solution of 80 mg. (0.13 mmole) of 1-(2,3,5-tri-O-benzoyl-2-C-methyl-β-D-ribofuranosyl)-5-fluoro-4-methoxy-2(1H)-pyrimidinone in 7 ml. of methanol, saturated with ammonia at 0° C., is heated at 100° C. in a sealed tube for 18 hours. The reaction solution is concentrated at reduced pressure and the residue is dissolved in 10 ml. of water and extracted with three 5-ml. portion of ether. The aqueous phase is concentrated at reduced pressure and the residue, when crystallized from 0.2 ml. of methanol plus 0.01 ml. of ether, gives 24 mg. (67%) of 5 - fluoro - 2' - C - methylcytidine: M.P. 247–249° C.; $R_f$ 0.78—thin layer chromatography on cellulose in water; $[\phi]_{400}$ +1200°, $[\phi]_{302}$ +15,700° (pk.), $[\phi]_{281}$ 0°, $[\phi]_{255}$ —18,700° (tr.), $[\phi]_{242}$ —16,300° (pk.), $[\phi]_{233}$ —17,700° (tr.), $[\phi]_{219}$ 0°;

$\lambda_{max.}^{H_2O}$ m$\mu$ ($\epsilon \times 10^{-3}$): pH 1—214 (9.7), 292 (11.1); pH 7—213 (8.9), 238 (7.7), 282.5 (8.0); pH 13—237 (7.7), 283 (8.1).

*Analysis.*—Calcd. for $C_{10}H_{14}FN_3O_5$: C, 43.38; H, 5.25; N, 14.98. Found: C, 43.63; H, 5.13; N, 15.27.

When the 1 - (2,3,5-tri-O-benzoyl-2-C-methyl-β-D-ribofuranosyl)-5-fluoro-4-methoxy-2(1H)-pyrimidinone in the above procedure is replaced by an equivalent amount of 1 - (2,3,5 - tri-O-benzoyl-2-C-ethyl-β-D-ribofuranosyl)-5-fluoro - 4 - methoxy - 2(1H)-pyrimidinone, 1-(2,3,5-tri-O-benzoyl-3-C-methyl-β-D-ribofuranosyl)-5-fluoro-4 - methoxy-2(1H)-pyrimidinone, or 1-(2,3,5-tri-O-benzoyl-3-C-ethyl - β - D-ribofuranosyl)-5-fluoro-4-methoxy-2(1H)-pyrimidinone there is obtained respectively 5-fluoro-2'-C-ethylcytidine, 5-fluoro-3'-C-methylcytidine, or 5-fluoro-3'-C-ethylcytidine.

EXAMPLE 62

5-fluoro-(2-C-methyl-β-D-ribofuranosyl)uracil- [5-fluoro-2'-C-methyluridine]

A suspension of 602.5 mg. (1.0 mole) of 1-(2,3,5-tri-O - benzoyl 2 - C - methyl - β - D - ribofuranosyl) - 5-fluoro - 4 - methoxy -2(1H) - pyrimidinone in 20 ml. of methanol is treated with 160 mg. (4.0 mmoles) of sodium hydroxide and 2 ml. of water. The mixture is refluxed for 45 minutes and the solution is concentrated at reduced pressure. The residue is dissolved in 20 ml. of water and small portions of Dowex 50×4(H+) resin are added until the pH of the solution is 4.0. The resin and precipitated benzoic acid are removed, and washed well with water. The combined filtrates are extracted with six 25-ml. portions of ether. The water layer is concentrated at reduced pressure and the residue (300 mg.) in 5 ml. of methanol is treated with 1 ml. of ether. The precipitated solid is removed and the filtrate is concentrated to 0.3 ml. and kept at 5° C. for 18 hours. The solid (107 mg., M.P. 196–205° C.) obtained, when recrystallized from 0.5 ml. of methanol and 0.5 ml. of ether gives 74 mg. (27%) of 5-fluoro-2'-C-methyluridine: M.P. 205–207° C.

When the 1 - (2,3,5 - tri - O - benzoyl - 2 - C - methyl-β - D - ribofuranosyl) - 5 - fluoro - 4 - methoxy - 2(1H)-pyrimidinone in the above procedure is replaced by an equivalent amount of 1 - (2,3,5 - tri - O - benzoyl - 2 - C-ethyl - β - D - ribofuranosyl) - 5 - fluoro - 4 - methoxy -2 (1H) - pyrimidinone, 1 - (2,3,5 - tri - O - benzoyl - 3 - C-methyl - β - D - ribofuranosyl) - 5 - fluoro - 4 - methoxy-2(1H) - pyrimidinone, or 1 - (2,3,5 - tri - O - benzoyl - 3-C - ethyl - β - D - ribofuranosyl) - 5 - fluoro - 4 - methoxy - 2(1H) - pyrimidinone there is obtained respectively 5 - fluoro - 2' - C - ethyluridine, 5 - fluoro - 3' - C-methyluridine, or 5-fluoro-3'-ethyluridine.

EXAMPLE 63

1-(2,3,5-tri-O-benzoyl-2-C-methyl-β-D-ribofuranosyl)-5-methyl-4-methoxy-2(1H)-pyrimidinone A solution of 4.8 g. (9.7 mmoles) of 2,3,5-tri-O-benzoyl - 2 - C - methyl - β - D - ribofuranosyl chloride in 18 ml. of dry toluene is added to 3.5 g. (22 mmoles) of 2,4 - dimethoxy - 5 - methyl - pyrimidine and the mixture is refluxed for 96 hours. The toluene solution is concentrated, the residue is then dissolved in 100 ml. of ether, extracted with three 50-ml. portions of 4 N hydrochloric acid and three 50-ml. portions of saturated sodium hydrogen carbonate and finally with water. The ether solution is concentrated and the residue is chromatographed on 150 g. of silica gel in benzene-ethyl acetate (19:1). After the elution of several by-products, fractions containing the product are obtained. Crystallization from benzene and ether gives 1 - (2,3,5 - tri - O - benzoyl - 2 - C - methyl - β - D - ribofuranosyl) - 5 - methyl - 4 - methoxy - 2 (1H)-pyrimidinone.

When the 2,3,5 - tri - O - benzoyl - 2 - C - methyl - β-D-ribofuranosyl in the above procedure is replaced by 2,3,5 - tri - O - benzoyl - 2 - C - ethyl - β - D - ribofuranosyl chloride, 2,3,5 - tri - O - benzoyl - 3 - C - methyl-β - D - ribofuranosyl chloride, or 2,3,5 - tri - O - benzoyl- 3 - C - ethyl - β - D - ribofuranosyl chloride there is obtained respectively 1 - (2,3,5 - tri - O - benzoyl - 2 - C-ethyl - β - D - ribofuranosyl) - 5 - methyl - 4 - methoxy-2(1H) - pyrimidinone, 1 - (2,3,5 - tri - O - benzoyl - 3 - C-methyl - β - D - ribofuranosyl) - 5 - methyl - 4 - methoxy-2(1H) - pyrimidinone, or 1 - (2,3,5 - tri - O - benzoyl - 3-C - ethyl - β - D - ribofuranosyl) - 5 - methyl - 4 - methoxy-2(1H)-pyrimidinone.

EXAMPLE 64

5-methyl-1-(2-C-methyl-β-D-ribofuranosyl)uracil- [5-methyl-2'-C-methyluridine]

A suspension of 602.5 mg. (1.0 mmole) of 1-(2,3,5-tri - O - benzoyl - 2 - C - methyl - β - D - ribofuranosyl)-5 - methyl - 4 - methoxy - 2(1H) - pyrimidinone in 20 ml. of methanol is treated with 160 mg. (4.0 mmoles) of sodium hydroxide and 2 ml. of water. The mixture is refluxed for 45 minutes and the solution is concentrated at reduced pressure. The residue is dissolved in 20 ml. of water and small portions of Dowex 50×4(H+) resin are added until the pH of the solution is 4.0. The resin and precipitated benzoic acid are removed and washed well with water; the combined filtrates are extracted with six 25-ml. portions of ether. The water layer is concentrated at reduced pressure and the residue in methanol is treated with ether. The precipitated solid is removed; the filtrate is concentrated and a residual solid containing 5-methyl-2'-C-methyluridine is obtained.

When the 1 - (2,3,5 - tri - O - benzoyl - 2 - C - methyl-β - D - ribofuranosyl) - 5 - methyl - 4 - methoxy - 2(1H)-pyrimidinone in the above procedure is replaced by an equivalent amount of 1 - (2,3,5 - tri - O - benzoyl - 2 - C-ethyl - β - D - ribofuranosyl) - 5 - methyl - 4 - methoxy-2(1H) - pyrimidinone, 1 - (2,3,5 - tri - O - benzoyl - 3 - C-methyl - β - D - ribofuranosyl) - 5 - methyl - 4 - methoxy-2(1H) - pyrimidinone, or 1 - (2,3,5 - tri - O - benzoyl - 3-C - ethyl - β - D - ribofuranosyl) - 5 - methyl - 4 - methoxy-2(1H)-pyrimidinone there is obtained respectively 5 - methyl - 2' - C - ethyluridine, 5 - methyl - 3' - C - methyluridine, or 5-methyl-3'-C-ethyluridine.

EXAMPLE 65

5-methyl-1-(2-C-methyl-β-D-ribofuranosyl)cytosine [5-methyl-2'-C-methylcytidine]

A solution of 80 mg. (0.13 mmole) of 1-(2,3,5-tri-O-benzoyl - 2 - C - methyl - β - D - ribofuranosyl) - 5 - methyl-4-methoxy-2(1H)-pyrimidinone in 7 ml. of methanol, saturated with ammonia at 0° C., is heated at 100° C. in a sealed tube for 18 hours. The reaction solution is concentrated at reduced pressure. The residue is then dissolved in 10 ml. of water and extracted with three 5-ml. portions of ether. The aqueous phase is concentrated at reduced pressure; the residue, when crystallized from methanol and ether, gives 5-methyl-2'-C-methylcytidine.

When the 1 - (2,3,5 - tri - O - benzoyl - 2 - C - methyl-β - D - ribofuranosyl) - 5 - methyl - 4 - methoxy - 2(1H)-pyrimidinone in the above procedure is replaced by an equivalent amount of 1 - (2,3,5 - tri - O - benzoyl - 2 - C-ethyl - β - D - ribofuranosyl) - 5 - methyl - 4 - methoxy-2(1H) - pyrimidinone, 1 - (2,3,5 - tri - O - benzoyl - 3 - C-methyl - β - D - ribofuranosyl) - 5 - methyl 4 - methoxy-2(1H) - pyrimidinone, or 1 - (2,3,5 - tri - O - benzoyl - 3-C - ethyl - β - D - ribofuranosyl) - 5 - methyl - 4 - methoxy-2(1H)-pyrimidinone there is obtained respectively 5 - methyl - 2' - C - ethylcytidine, 5 - methyl - 3' - C methylcytidine, or 5-methyl-3'-C-ethylcytidine.

What is claimed is:

1. A compound of the formula

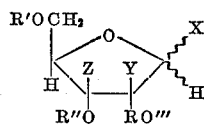

where
R', and R" and R''' are each hydrogen, or an acyl residue of an organic carboxylic acid selected from the group consisting of lower alkanoyl, benzoyl, halobenzoyl, nitrobenzoyl, loweralkoxybenzoyl, and loweralkylbenzoyl;

X is chloro, bromo, hydroxy, lower alkoxy or acyl, where acyl is defined as heretofore; and Y and Z are each lower alkyl or hydrogen, provided that when Y is lower alkyl Z is hydrogen, and when Y is hydrogen Z is lower alkyl.

2. The compounds of claim 1 wherein
R', R" and R''' are each hydrogen, or an acyl residue of an organic carboxylic acid selected from the group consisting of lower alkanoyl, benzoyl, halobenzoyl, nitrobenzoyl, loweralkoxybenzoyl, and loweralkylbenzoyl;
X is chloro, bromo, hydroxy, lower alkoxy or acyl, where acyl is defined as heretofore;
Y is methyl; and
Z is hydrogen.

3. The compounds of claim 2 wherein
R', R" and R''' are benzoyl;
X is chloro or bromo;
Y is methyl; and
Z is hydrogen.

4. The compounds of claim 1 wherein
R', R" and R''' are each hydrogen, or an acyl residue of an organic carboxylic acid selected from the group consisting of lower alkanoyl, benzoyl, halobenzoyl, nitrobenzoyl, loweralkoxybenzoyl, and loweralkylbenzoyl;
X is chloro, bromo, hydroxy, lower alkoxy or acyl, where acyl is defined as heretofore;
Y is hydrogen; and
Z is methyl.

5. The compounds of claim 4 wherein
R', R" and R''' are benzoyl;
X is chloro or bromo;
Y is hydrogen; and
Z is methyl.

6. The compounds of claim 1 wherein
R', R" and R''' are benzoyl;
X is chloro or bromo;
Y is lower alkyl; and
Z is hydrogen.

7. The compounds of claim 1 wherein
R', R" and R''' are benzoyl;
X is chloro or bromo;
Y is hydrogen; and
Z is lower alkyl.

8. A process for preparing the compounds of claim 1 wherein
R', R" and R''' are the same or different acyl group selected from the group consisting of lower alkanoyl, benzoyl, halobenzoyl, nitrobenzoyl, loweralkoxybenzoyl, and loweralkylbenzoyl;
X is chloro or bromo;
Y is methyl and Z is hydrogen,
which comprises the steps of
(A) acylating a compound having the following formula where R', R" and R''' are hydrogen

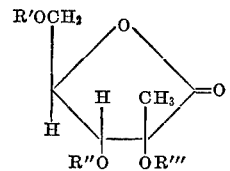

(II)

to afford a compound where R', R" and R''' are the same or different acyl substituent selected from the group consisting of alkanoyl, benzoyl, halobenzoyl, nitrobenzoyl, loweralkoxybenzoyl, and loweralkylbenzoyl;

(B) reducing the product obtained in Step A with a dialkyl borane in an anhydrous solvent at a temperature of from 0° to 25° C., to obtain a compound having the following formula

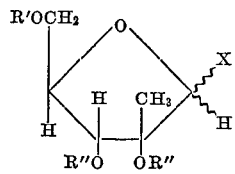

(V)

where X is hydroxy and R', R" and R'" are as above defined;

(C) acylating the product of Step B to obtain a product having Formula V where R', R", R'" and X are the same or different acyl substituent selected from the group consisting of lower alkanoyl, benzoyl, halobenzoyl, nitrobenzoyl, loweralkoxybenzoyl, and loweralkyl-benzoyl; and (D) treating the product of Step C with hydrogen halide at a temperature within the range of 0° and 25° C.

9. A process for preparing the compounds of claim 1 wherein
R', R" and R'" are the same or different acyl residue of an organic acid selected from the group consisting of lower alkanoyl, benzoyl, halobenzoyl, nitrobenzoyl, loweralkoxybenzoyl, and loweralkylbenzoyl;
X is chloro or bromo;
Y is lower alkyl; and
Z is hydrogen,
which comprises the steps of
(A) treating a compound having the following formula

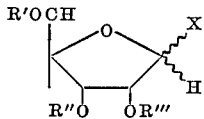

(VII)

with an aqueous solution of acetone at a temperature within the range of 5° and 50° C. to obtain a compound having the following formula

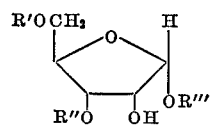

(VIII)

wherein in each formula R', R" and R'" are defined as above;

(B) treating the product of Step A with an acidic solution of an alkanol at a temperature within the range of 5° and 50° C. to obtain the compound of Formula VIII, where R'" is lower alkyl;

(C) oxidizing the product of Step B to obtain a compound having the formula

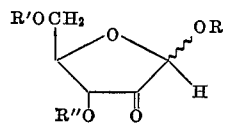

(X)

where R is loweralkyl; and R' and R" are defined as above;

(D) treating the product of Step C in ether solution with a lower alkyl magnesium halide to afford an alkyl 3,5-di-O-acyl-2-C-lower-alkyl-α-D-ribofuranoside having the formula

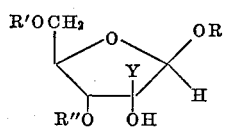

(XI)

(E) acylating the product of Step D to produce the corresponding alkyl 2,3,5-tri-O-acyl-2-C-lower-alkyl-α-D-ribofuranoside having the formula

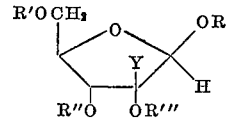

(XII)

where R, R', R", R'" and Y are defined as above; and (F) treating a solution of the product of Step E in acetic acid with hydrogen halide.

10. A process for preparing the compounds of claim 1 wherein
R', R" and R'" are the same or different acyl radical selected from the group consisting of lower alkanoyl, benzoyl, halobenzoyl, nitrobenzoyl, loweralkoxybenzoyl, and loweralkylbenzoyl;
X is chloro or bromo;
Y is hydrogen; and
Z is lower alkyl,
which comprises the steps of
(A) treating a compound having the formula

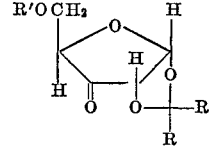

(XIV)

where R is lower alkyl and R' is defined as above, with a lower alkyl magnesium halide to form a compound having the formula

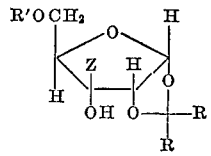

(XV)

where R, R' and Z are defined as above; and
(B) converting said compound (XV) to the following compound

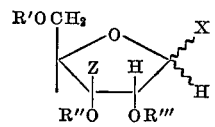

(XVIII)

(1) where X is hydroxy or halogen, by acidic alcoholysis of the 1,2-isopropylidene group to replace by 1-alkoxy-2-hydroxy groups, acylation at the 2,3-position, and halogen replacement of the 1-alkoxy group at the 1-position; or (2) where X is acyl and acyl is defined as above, by acylation under basic conditions at the 3-position; hydrolysis with strong acid of the 1,2-isopropylidene group to replace by 1- and 2-hydroxy groups, and then acylation of the 1- and 2-hydroxy groups.

11. A compound of the formula

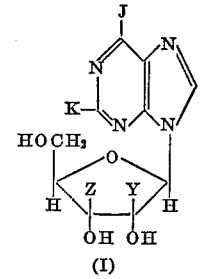

(I)

where
J is hydrogen, lower alkyl, halogen, mercapto, lower alkylmercapto, amino or lower-alkyl-substitutedamino when K is hydrogen; but J is amino when K is halogen, hydroxy or amino, provided that when J is amino and K is hydroxy, the ribofuranoyl moiety may also be joined to the purine at the 7-position; and Y and Z are each hydrogen or lower alkyl, provided that when Y is hydrogen Z is lower alkyl, and when Y is lower alkyl Z is hydrogen.

12. The compound of claim 11 wherein Y is methyl, J is amino and K and Z are hydrogen.

13. The compound of claim 11 wherein Y is methyl, J is methylamino, and K and Z are hydrogen.

14. The compound of claim 11 wherein Y is methyl, J is thiol, and K and Z are hydrogen.

15. The compound of claim 11 wherein Y is methyl, J and K are amino, and Z is hydrogen.

16. The compound of claim 11 wherein Y is methyl, J is hydroxy, K is amino and Z is hydrogen.

17. The compound of claim 11 wherein Z is methyl, K and Y are hydrogen and J is amino.

18. The compound of claim 11 wherein Z is methyl, K and Y are hydrogen and J is methylamino.

19. The compound of claim 11 wherein Z is methyl, K and Y are hydrogen and J is thio.

20. The compound of claim 11 wherein Z is methyl, Y is hydrogen, J is hydroxy and K is amino.

21. A compound having the following formula

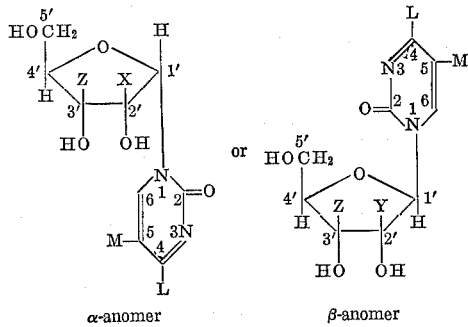

α-anomer   β-anomer wherein

L and M may be the same or different, lower alkoxy, hydroxy, amino, or lower-alkyl-substituted-amino, and in addition, M may also be hydrogen, lower alkyl, halogen or halogenated-lower-alkyl, especially trifluoromethyl; and Y and Z are each hydrogen or lower alkyl, provided that when Y is hydrogen Z is lower alkyl, and when Y is lower alkyl Z is hydrogen.

22. The compounds of claim 21 wherein Y is hydrogen and Z is methyl.

23. The compounds of claim 21 wherein Z is hydrogen and Y is methyl.

24. The compounds of claim 21 wherein L is hydroxy.

25. The compounds of claim 21 wherein L is amino.

26. The compounds of claim 21 wherein L is amino, M and Z are hydrogen, and Y is methyl.

27. The compounds of claim 21 wherein L is amino, M and Y are hydrogen and Z is methyl.

28. The compounds of claim 21 wherein L is amino, M is fluoro, Y is methyl and Z is hydrogen.

29. The compounds of claim 21 wherein L is hydroxy, M is fluoro, Y is methyl and Z is hydrogen.

30. The compounds of claim 21 wherein L is hydroxy, M and Z are hydrogen and Y is methyl.

References Cited
UNITED STATES PATENTS

| | | | |
|---|---|---|---|
| 2,876,230 | 3/1959 | Folkers et al. | 260—211.5 |
| 2,881,164 | 4/1959 | Kissman et al. | 260—211.5 |
| 3,074,929 | 1/1963 | Hitchings et al. | 260—211.5 |
| 3,116,282 | 12/1963 | Hunter | 260—211.5 |
| 3,225,029 | 12/1965 | Yamaoka | 260—211.5 |
| 3,300,478 | 1/1967 | Wechter | 260—211.5 |
| 3,328,389 | 6/1967 | Shimizu et al. | 260—211.5 |
| 3,380,996 | 4/1968 | Honjo et al. | 260—211.5 |

LEWIS GOTTS, Primary Examiner

J. R. BROWN, Assistant Examiner

U.S. Cl. X.R.

260—210, 211.5, 999